US011453601B2

(12) United States Patent
Johns et al.

(10) Patent No.: US 11,453,601 B2
(45) Date of Patent: Sep. 27, 2022

(54) FRAC SAND SEPARATOR SYSTEM

(71) Applicant: SPM Oil & Gas PC LLC, Fort Worth, TX (US)

(72) Inventors: Roger Johns, Houston, TX (US); Eric Iwasenko, Houston, TX (US); Matthew B. Green, Norman, OK (US); Andres Felipe Perilla, Norman, OK (US); Jeffery Shaun Daniels, Yukon, OK (US)

(73) Assignee: SPM Oil & Gas PC LLC, Fort Worth, TX (US)

( * ) Notice: Subject to any disclaimer, the term of this patent is extended or adjusted under 35 U.S.C. 154(b) by 111 days.

(21) Appl. No.: 17/045,990

(22) PCT Filed: Apr. 12, 2019

(86) PCT No.: PCT/US2019/027311
§ 371 (c)(1),
(2) Date: Oct. 7, 2020

(87) PCT Pub. No.: WO2019/200311
PCT Pub. Date: Oct. 17, 2019

(65) Prior Publication Data
US 2021/0363029 A1 Nov. 25, 2021

Related U.S. Application Data

(60) Provisional application No. 62/656,970, filed on Apr. 12, 2018.

(51) Int. Cl.
*C02F 1/00* (2006.01)
*B01D 21/30* (2006.01)
(Continued)

(52) U.S. Cl.
CPC ............ *C02F 1/008* (2013.01); *B01D 21/245* (2013.01); *B01D 21/267* (2013.01);
(Continued)

(58) Field of Classification Search
None
See application file for complete search history.

(56) References Cited

U.S. PATENT DOCUMENTS

| 6,790,367 | B2 * | 9/2004 | Schmigel | ............... B01D 21/32 210/103 |
| 8,623,221 | B1 * | 1/2014 | Boyd | ................. B01D 21/2494 96/182 |
| 2012/0012309 | A1 | 1/2012 | Noles, Jr. | |
| 2014/0345727 | A1 * | 11/2014 | Gilmore | ............... G05D 7/0635 137/624.21 |
| 2016/0059153 | A1 * | 3/2016 | Smith | .................. B01D 21/302 210/744 |

(Continued)

OTHER PUBLICATIONS

International Search Report and Written Opinion received in Patent Cooperation Treaty Application No. PCT/US2019/027311, dated Jul. 17, 2019.

*Primary Examiner* — Bradley R Spies
*Assistant Examiner* — Jeannie McDermott

(57) ABSTRACT

A frac sand separator system includes a sand separator having an inlet fluidly connected to a well for receiving a fracking return mixture from the well. The sand separator is configured to separate water of the fracking return mixture from particulate matter of the fracking return mixture. The sand separator includes an outlet. The frac sand separator system includes a collection container fluidly connected to the outlet of the sand separator for receiving the particulate matter from the sand separator. At least one outlet valve is fluidly connected between the outlet of the sand separator and the collection container. The frac sand separator system includes a computing device operatively connected to the at least one outlet valve. The computing device includes a processor configured to automatically open the at least one outlet valve such that the particulate matter is released from the sand separator into the collection container.

19 Claims, 9 Drawing Sheets

(51) Int. Cl.
  *B01D 21/26* (2006.01)
  *B01D 21/24* (2006.01)
  *C02F 1/38* (2006.01)
  *E21B 27/00* (2006.01)
  *E21B 34/16* (2006.01)
  *E21B 43/34* (2006.01)
  *C02F 103/10* (2006.01)

(52) U.S. Cl.
  CPC ......... *B01D 21/302* (2013.01); *B01D 21/307* (2013.01); *C02F 1/38* (2013.01); *E21B 27/00* (2013.01); *E21B 34/16* (2013.01); *E21B 43/35* (2020.05); *C02F 2103/10* (2013.01); *C02F 2201/005* (2013.01); *C02F 2209/003* (2013.01); *C02F 2209/02* (2013.01); *C02F 2209/03* (2013.01); *C02F 2209/44* (2013.01)

(56) References Cited

U.S. PATENT DOCUMENTS

| | | | |
|---|---|---|---|
| 2016/0375386 A1* | 12/2016 | Magnus | B01D 45/04 95/267 |
| 2017/0183931 A1 | 6/2017 | Jani | |
| 2018/0104622 A1* | 4/2018 | Dawson | B01D 21/0015 |
| 2018/0333657 A1* | 11/2018 | Lyon | B01D 21/267 |
| 2019/0033898 A1* | 1/2019 | Shah | G01N 29/14 |
| 2019/0063203 A1* | 2/2019 | Arefjord | B01D 17/00 |
| 2019/0063984 A1* | 2/2019 | Bowley | C02F 1/385 |
| 2020/0324323 A1* | 10/2020 | Bruntveit | B08B 3/04 |
| 2021/0077923 A1* | 3/2021 | Carlson | E21B 43/34 |
| 2021/0131256 A1* | 5/2021 | Coombe | B01D 29/35 |

\* cited by examiner

FRAC SAND SEPARATOR SYSTEM

CROSS-REFERENCE TO RELATED APPLICATION

This application is a national phase application of Patent Cooperation Treaty Application No. PCT/US2019/027311 filed Apr. 12, 2019, which claims priority to U.S. Provisional Application No. 62/656,970 filed Apr. 12, 2018 and U.S. Provisional Application No. 62/659,033 filed Apr. 17, 2018, which is incorporated herein by reference in their entirety.

TECHNICAL FIELD

This disclosure relates to fracturing operations, and, in particular, to frac sand separators used during fracturing operations.

BACKGROUND OF THE DISCLOSURE

Some subsurface rock units (e.g., organic shale, etc.) contain relatively large amounts of oil, natural gas, and/or natural gas liquids that will not flow freely to an oil and gas well, for example because the rock unit either lacks permeability (i.e., interconnected pore spaces) and/or the pore spaces in the rock are sufficiently small that fluids cannot flow through them. Fracturing operations solve such a flow problem by generating fractures in the rock by a well into the rock, sealing the portion of the well in the petroleum-bearing zone, and pumping water under high pressure into the sealed portion of the well. The pressure of the water pumped into the sealed portion of the well sufficiently high to exceed the breaking point of the surrounding rocks. When the breaking point is reached, the formation fractures and water rushes rapidly into the fractures, inflating the fractures and extending deeper into the rock. The water pumped into the sealed portion of the well is generally treated with chemicals and/or thickeners (e.g., guar gum, etc.) to create a viscous gel that facilitates the ability of the water to carry grains of particulate matter (e.g., frac sand, etc.) in suspension. Accordingly, the rush of water carries billions of grains of frac sand deep into the fractures. Frac sand is a crush-resistant material produced for use by the petroleum industry that is typically a relatively high-purity quartz sand with durable and round grains. In some examples, a few thousand tons of frac sand is required to stimulate a single well.

During fracturing operations, a fluid mixture that includes water and particulate matter (e.g., frac sand, earth, and/or other particulate matter, etc.) is returned from the well to a frac sand separator. The frac sand separator separates water from the particulate matter of the frac return mixture. For example, the particulate matter is forced to the bottom of a vessel of the frac sand separator, while water is removed via an outlet from the top of the vessel. In some examples, some water remains with the particulate matter, forming a slurry. The vessel of the frac sand separator must be periodically emptied to continue a fracturing operation. Currently, the determination of when to empty the vessels of frac sand separators is performed manually by an operator. For example, the operator may touch the vessel to determine the level of the particulate matter (e.g., the level of the slurry containing the particulate matter, etc.) within the vessel using the perceived temperature of the vessel. The operator then decides whether or not to empty the vessel based on the determined level. In other examples, the operator determines when to empty the vessel using instinct or a predetermined timing (e.g., every 20 minutes or so, etc.). But, manually determining when to empty the vessel of a frac sand separator may be unreliable, time-consuming, and/or costly, which may increase the costs of fracturing operations.

SUMMARY

This summary is provided to introduce a selection of concepts in a simplified form that are further described below in the Detailed Description. This summary is not intended to identify key features or essential features of the claimed subject matter. Nor is it intended to be used as an aid in determining the scope of the claimed subject matter.

In a first aspect, a frac sand separator system includes a sand separator having an inlet fluidly connected to a well for receiving a fracking return mixture from the well. The sand separator is configured to separate water of the fracking return mixture from particulate matter of the fracking return mixture. The sand separator includes an outlet. The frac sand separator system includes a collection container fluidly connected to the outlet of the sand separator for receiving the particulate matter from the sand separator. The frac sand separator system includes at least one outlet valve fluidly connected between the outlet of the sand separator and the collection container. The frac sand separator system includes a computing device operatively connected to the at least one outlet valve. The computing device includes a processor configured to automatically open the at least one outlet valve such that the particulate matter is released from the sand separator into the collection container.

In some embodiments, the processor is configured to automatically open the at least one outlet valve upon the passage of a predetermined amount of time.

In some embodiments, the processor is configured to automatically open the at least one outlet valve based on a level of the particulate matter within the sand separator.

In some embodiments, the processor is configured to determine a level of the particulate matter within the sand separator based on at least one temperature of the sand separator, the processor being configured to automatically open the at least one outlet valve when the determined level equals or exceeds a predetermined level.

In some embodiments, the frac sand separator system includes at least one temperature sensor configured to measure at least one temperature of the sand separator. The computing device is operatively connected to the at least one temperature sensor for receiving the at least one measured temperature from the at least one temperature sensor. The processor is configured to automatically open the at least one outlet valve based on the at least one measure temperature received from the at least one temperature sensor.

In some embodiments, the frac sand separator system includes at least one mass sensor configured to measure a mass of the sand separator. The computing device is operatively connected to the at least one mass sensor for receiving the measured mass from the at least one mass sensor. The processor is configured to automatically open the at least one outlet valve when the measured mass approximately equals or exceeds a predetermined mass.

In some embodiments, the frac sand separator system includes at least one level sensor configured to measure a level of the particulate matter within the sand separator. The at least one level sensor includes at least one of a nuclear densometer, an acoustic sensor, or a radar sensor. The computing device is operatively connected to the at least one level sensor for receiving the measured level from the at least one level sensor. The processor is configured to automatically open the at least one outlet valve based on the measured level received from the at least one level sensor.

In some embodiments, the outlet is a particulate outlet and the sand separator includes a water outlet for releasing the water from the sand separator. The frac sand separator system includes a particulate sensor configured to detect particulate matter within the water outlet. The computing device is operatively connected to the particulate sensor. The processor is configured to automatically open the at least one outlet valve based on whether particulate matter is detected by the particulate sensor.

In some embodiments, the processor is configured to automatically close the at least one outlet valve based on at least one of: a predetermined period of time the at least one outlet valve has been open, a temperature of the sand separator, a mass of the sand separator, a level of the particulate matter within the sand separator, a pressure within the outlet, or an amount of particulate matter detected within the outlet.

In some embodiments, the frac sand separator system includes a choke valve operatively connected between the outlet of the sand separator and the collection container. The computing device is operatively connected to the choke valve. The processor is configured to automatically open and close the choke valve based on a pressure within the outlet of the sand separator.

In a second aspect, a computerized method includes: receiving a fracking return mixture from a well into a sand separator; separating the fracking return mixture within the sand separator into water and particulate matter; and automatically opening an outlet valve of the sand separator such that the particulate matter is released from the sand separator into a collection container.

In some embodiments, automatically opening the outlet valve of the sand separator includes automatically opening the outlet valve upon the passage of a predetermined amount of time.

In some embodiments, automatically opening the outlet valve of the sand separator includes automatically opening the outlet valve based on a level of the particulate matter within the sand separator.

In some embodiments, automatically opening the outlet valve of the sand separator includes automatically opening the outlet valve based on at least one measured temperature of the sand separator.

In some embodiments, automatically opening the outlet valve of the sand separator includes: measuring at least one temperature of the sand separator; determining a level of the particulate matter within the sand separator based on the at least one measured temperature; and automatically opening the outlet valve based on the determined level of the particulate matter within the sand separator.

In some embodiments, automatically opening the outlet valve of the sand separator includes automatically opening the outlet valve based on a mass of the sand separator.

In some embodiments, automatically opening the outlet valve of the sand separator includes automatically opening the outlet valve based on whether particulate matter is detected within a water outlet of the sand separator.

In some embodiments, the computerized method includes automatically closing the outlet valve based on at least one of: a predetermined period of time the outlet valve has been open, a temperature of the sand separator, a mass of the sand separator, a level of the particulate matter within the sand separator, a pressure within an outlet of the sand separator, or an amount of particulate matter detected within the outlet.

In a third aspect, one or more computer storage media is provided having computer-executable instructions that, in response to execution by a processor, cause the processor to at least: receive a fracking return mixture from a well into a sand separator; separate the fracking return mixture within the sand separator into water and particulate matter; and automatically open an outlet valve of the sand separator such that the particulate matter is released from the sand separator into a collection container.

In some embodiments, automatically opening the outlet valve of the sand separator includes: measuring at least one temperature of the sand separator; determining a level of the particulate matter within the sand separator based on the at least one measured temperature; and automatically opening the outlet valve based on the determined level of the particulate matter within the sand separator.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE DRAWINGS

The accompanying drawings facilitate an understanding of the various embodiments.

Corresponding reference characters indicate corresponding parts throughout the drawings.

DETAILED DESCRIPTION

Certain embodiments of the disclosure provide a frac sand separator system includes a sand separator having an inlet fluidly connected to a well for receiving a fracking return mixture from the well. The sand separator is configured to separate water of the fracking return mixture from particulate matter of the fracking return mixture. The sand separator includes an outlet. The frac sand separator system includes a collection container fluidly connected to the outlet of the sand separator for receiving the particulate matter from the sand separator. The frac sand separator system includes at least one outlet valve fluidly connected between the outlet of the sand separator and the collection container. The frac sand separator system includes a computing device operatively connected to the at least one outlet valve. The computing device includes a processor configured to automatically open the at least one outlet valve such that the particulate matter is released from the sand separator into the collection container.

Certain embodiments of the disclosure provides a more reliable, less time-consuming, and/or less costly determination of when to empty the vessel of a sand separator. Certain embodiments of the disclosure reduce or eliminate the determinations and/or operations performed by a human operator during a fracturing operation, thereby reducing or eliminating human error, the amount of labor performed by operators, and/or the like.

Figure 1:
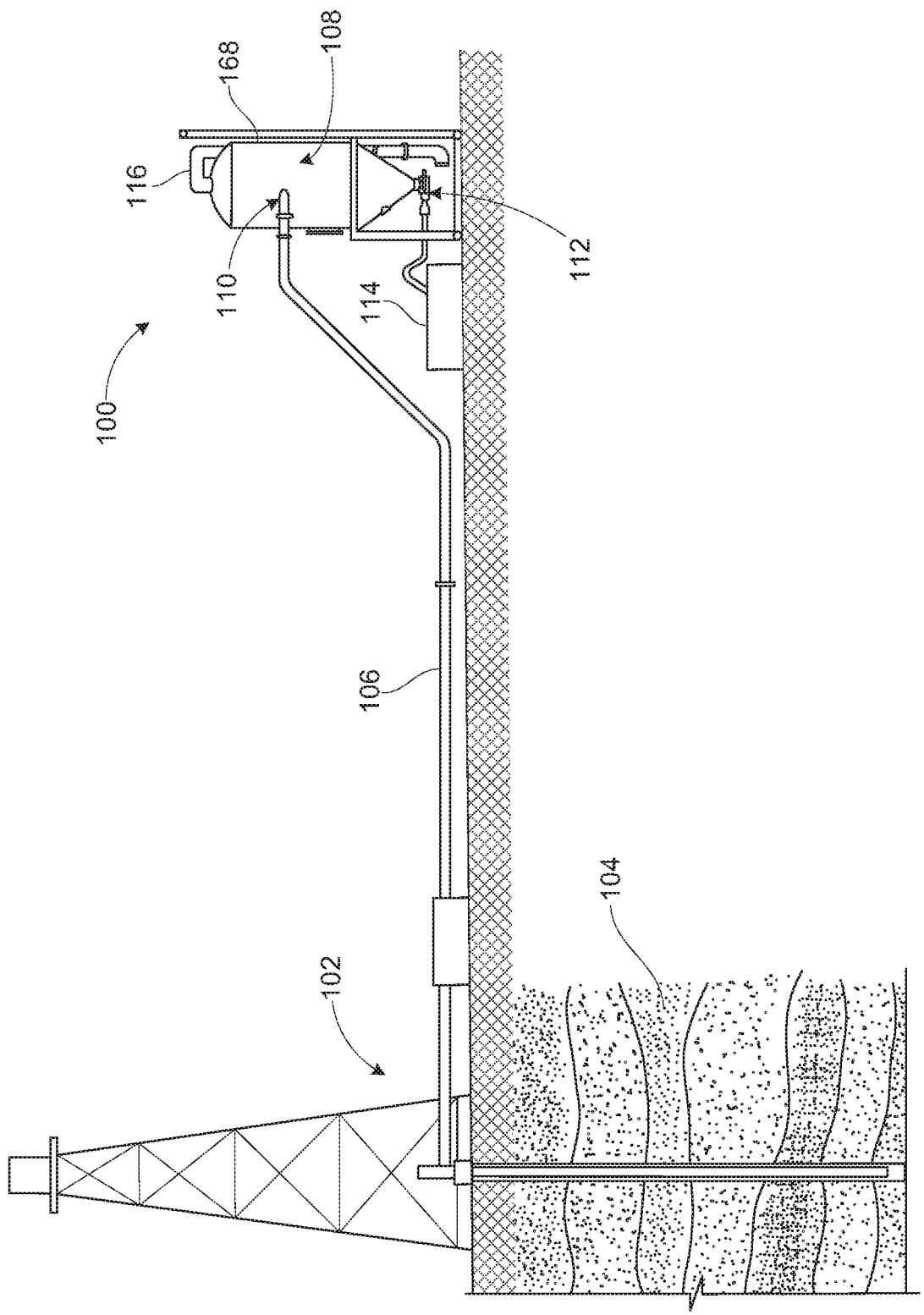
FIG. 1 is a schematic elevational view of a wellsite including a frac sand separator system according to an exemplary embodiment.

Referring to FIG. 1, an exemplary frac sand separator system 100 is illustrated. The frac sand separator system 100 is associated with a well 102 of a subsurface earth formation 104. The frac sand separator system 100 includes a sand separator 108 having an inlet 110 that is fluidly connected to a return conduit 106 of the well 102. During fracturing operations, a fluid mixture that includes water and particulate matter (e.g., frac sand, earth, and/or other particulate matter, etc.) is returned from the well 102 to the inlet 110 of the sand separator 108 through the return conduit 106. The fluid mixture returned from the well 102 to the sand separator 108 will be referred to herein as a "fracking return mixture". The fracking return mixture may include hydrocarbons. The sand separator 108 separates the water of the fracking return mixture from the particulate matter of the frac return mixture. For example, the particulate matter is forced to the bottom (as viewed in FIG. 1) of a vessel 168 of the sand separator 108, while the water is removed via a water outlet 116 from the top (as viewed in FIG. 1) of the vessel 168. In some examples, some water remains with the particulate matter, forming a slurry. For example, a slurry that contains the particulate matter is a mixture of approximately 90% particulate matter and approximately 10% water in some examples. The particulate matter (e.g., the slurry that contains the particulate matter, etc.) may include hydrocarbons.

The vessel 168 of the sand separator 108 must be periodically emptied during fracturing operations. Accordingly, the sand separator 108 includes a particulate outlet 112 that is fluidly connected to a collection container 114 such that the particulate matter (e.g., the slurry that contains the particulate matter, etc.) can be released from the bottom of the vessel 168 into the collection container 114.

According to some embodiments, the frac sand separator system 100 is freestanding on the ground, mounted to a trailer for towing between operational sites, mounted to a skid, loaded on a manifold, otherwise transported, and/or the like. The frac sand separator system 100 is not limited to being used with fracturing operations. Rather, the embodiments disclosed herein may be used with any other type of oil and gas operation (e.g., drilling operations, etc.) and any type of subsurface earth formation.

Figure 2:
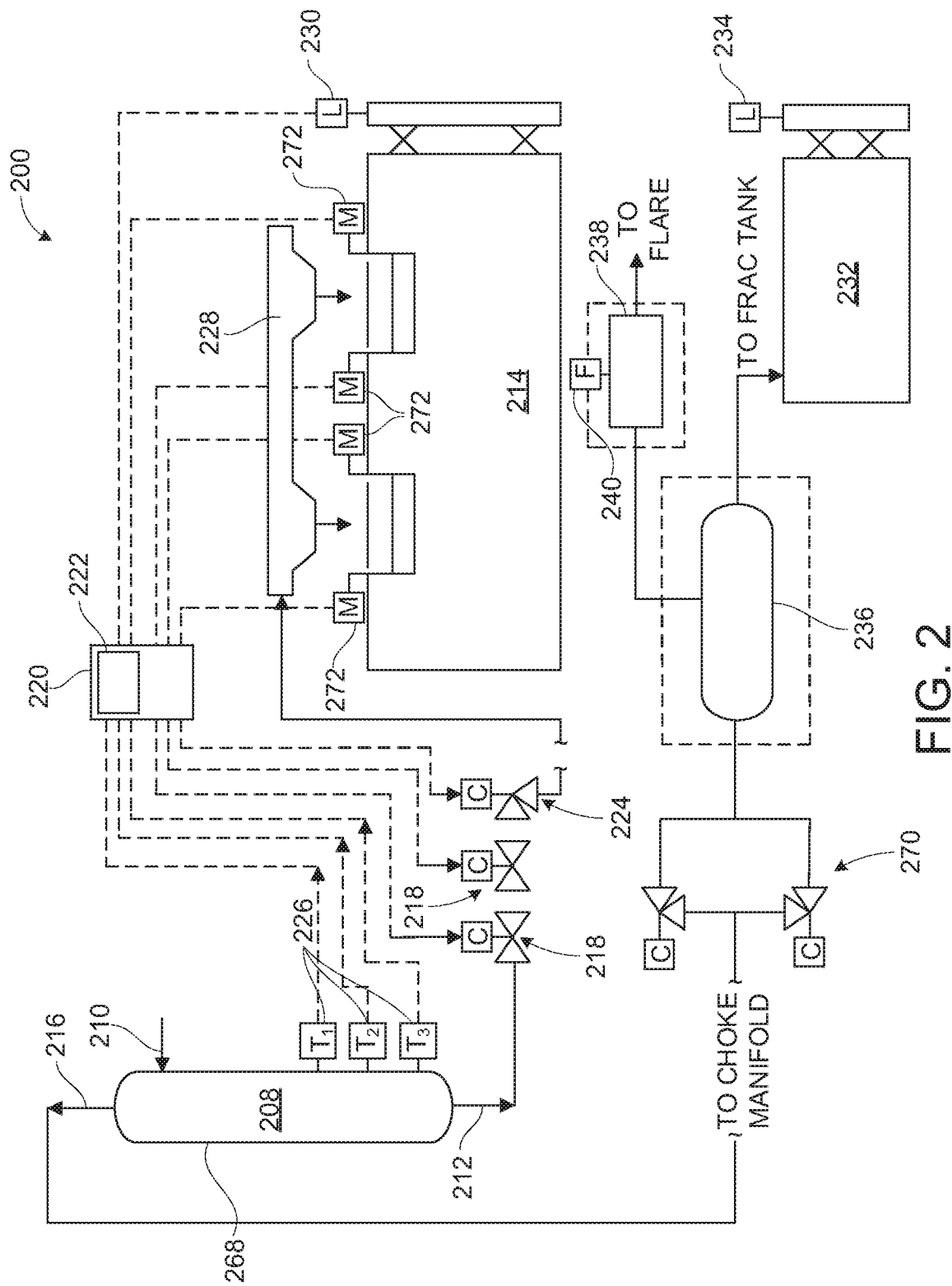
FIG. 2 is a schematic diagram of a frac sand separator system according an exemplary embodiment.

FIG. 2 illustrates a frac sand separator system 200 according to an exemplary embodiment. The frac sand separator system 200 includes a sand separator 208, a collection container 214, and a computing device 220. The sand separator 208 includes a vessel 268 having an inlet 210 that is fluidly connected to a well (e.g., the well 102 shown in FIG. 1) for receiving a fracking return mixture from the well during fracturing operations. The sand separator 208 is configured to separate water of the fracking return mixture from particulate matter of the frac return mixture. As described above, in some examples some water remains with the particulate matter such that the sand separator 208 separates the fracking return mixture into water and a slurry that includes the particulate matter. The sand separator 208 includes a particulate outlet 212.

The collection container 214 is fluidly connected to the particulate outlet 212 for receiving the particulate matter (e.g., the slurry containing the particulate matter, etc.) from the vessel 268 of the sand separator 208. The frac sand separator system 200 includes one or more outlet valves 218 fluidly connected between the particulate outlet 212 and the collection container 214 for releasing the particulate matter from the vessel 268 of the sand separator 208 to thereby empty the vessel 268. As will be described in more detail below, the computing device 220 is operatively connected to one or more of the outlet valves 218 for automatic control of the outlet valve(s) 218 to automatically empty the particulate matter from the vessel 268 of the sand separator 208.

The vessel 268 of the sand separator 208 includes a water outlet 216 that is fluidly connected to a frac tank 232 for removing the water that has been separated from the particulate matter of the fracking return mixture from the vessel 268. Optionally, a choke manifold 270 is fluidly connected between the water outlet 216 and the frac tank 232 such that the water removed from the vessel 268 into the frac tank 232 through the choke manifold 270. The frac tank 232 optionally includes one or more level sensors 234 operatively connected to the frac tank 232 for measuring a level of fluid within the frac tank 232. The level sensor(s) 234 may include any type of analog and/or digital sensor configured to determine the level of fluid within the frac tank 232, such as, but not limited to, a nuclear densometer, an acoustic sensor, a radar sensor, and/or the like.

In some examples, the frac sand separator system 200 includes a vent gas separator (VGS) 236 (or an Eco tank) fluidly connected between the water outlet 216 of the vessel 268 and the frac tank 232. Optionally, a vent gas analyzer 238 that includes a gas flow meter 240 is fluidly connected to the VGS 236 for controlling and/or monitoring the venting of gas from the VGS 236 (or the Eco tank) to, for example, a flare.

The sand separator 208 may include any type of separator that is configured to separate the water of the fracking return fluid from the particulate matter of the fracking return fluid. For example, in some embodiments the sand separator is a cyclonic separator that is configured to force the particulate matter of the fracking return mixture to the bottom of the vessel 268, while the water of the fracking return mixture is removed from the top of the vessel 268 via the water outlet 216. Other types of separators are used in other embodiments.

The frac sand separator system 200 includes one or more temperature sensors 226 operatively connected to the vessel 268 of the sand separator 208 for measuring one or more temperatures within the vessel 268. The temperature sensor(s) 226 can be located at various locations along the vessel 268 for measuring one or more temperatures that indicates a level of the particulate matter (e.g., the slurry containing the particulate matter, etc.) within the vessel 268. The frac sand separator system 200 includes any number of the temperature sensors 226. In the exemplary embodiment of the system 200, three of the temperature sensors 226 are provided for measuring the temperatures at three different locations within the vessel 268, for example a low level, a mid-level, and a high level within the vessel 268. In another example, two temperature sensors 226 are provided for measuring: (1) the temperature of water and/or the particulate matter (e.g., the slurry containing the particulate matter, etc.) at a first location within the vessel 268 (e.g., a location below a maximum allowed level of the particulate matter, etc.); and (2) the temperature of water at a second location within the vessel 268 that corresponds to the maximum allowed level of the particulate matter. Yet another example includes using a single temperature sensor 226 for measuring the temperature within the vessel 268 at a single location, for example at a location that corresponds to a maximum allowed level of the particulate matter.

Each temperature sensor 226 may include any type of analog and/or digital sensor configured to measure one or more temperatures within the vessel 268 of the sand separator 208, such as, but not limited to, a thermocouple, a thermometer, and/or the like. In some examples, one or more of the temperature sensors 226 is a 20 milliampere (mA) sensor.

Optionally, a scale 228 is fluidly connected between the particulate outlet 212 of the sand separator 208 and the collection container 214 for measuring the weight of the particulate matter (e.g., the slurry containing the particulate matter, etc.) released from the vessel 268 of the sand separator 208 through the particulate outlet 212. Specifically, the particulate matter released from the particulate outlet 212 enters the scale 228, which separates the particulate matter from any water mixed therewith (e.g., water of a slurry containing the particulate matter, etc.), for example by filtration, diffusion, gravity, and/or the like. Any type of structure, geometry, device, and/or the like may be used to retain the particulate matter and allow the water mixed therewith to drain, such as, but not limited to, a flat, round, half cylinder, v-bottom, bird/bath vortex geometries, and/or the like.

Once the water has adequately drained, one or more mass sensors 272 of the scale 228 weigh the retained particulate matter. The scale 228 may include any number of the mass sensors 272. Each mass sensor 272 may include any type of analog and/or digital sensor, such as, but not limited to, a load cell, a strain gage, a displacement-based sensor, a pressure-based sensor, and/or the like.

Once weighed, the scale 228 releases (e.g., dumps, etc.) the particulate matter into the collection container 214. Any type of structure, geometry, motion, device, and/or the like may be used to release the particulate matter from the scale 228 into the collection container 214, such as, but not limited to, rotating, inverting, opening, scraping, tilting, and/or the like the scale 228. The collection container 214 optionally includes one or more level sensors 230 for measuring a level of the particulate matter within the collection container 214. The level sensor(s) 234 may include any type of analog and/or digital sensor configured to determine the level of particulate matter within the collection container 214, such as, but not limited to, a nuclear densometer, an acoustic sensor, a radar sensor, and/or the like. In some examples, the collection container 214 is at atmospheric pressure.

Figure 3:
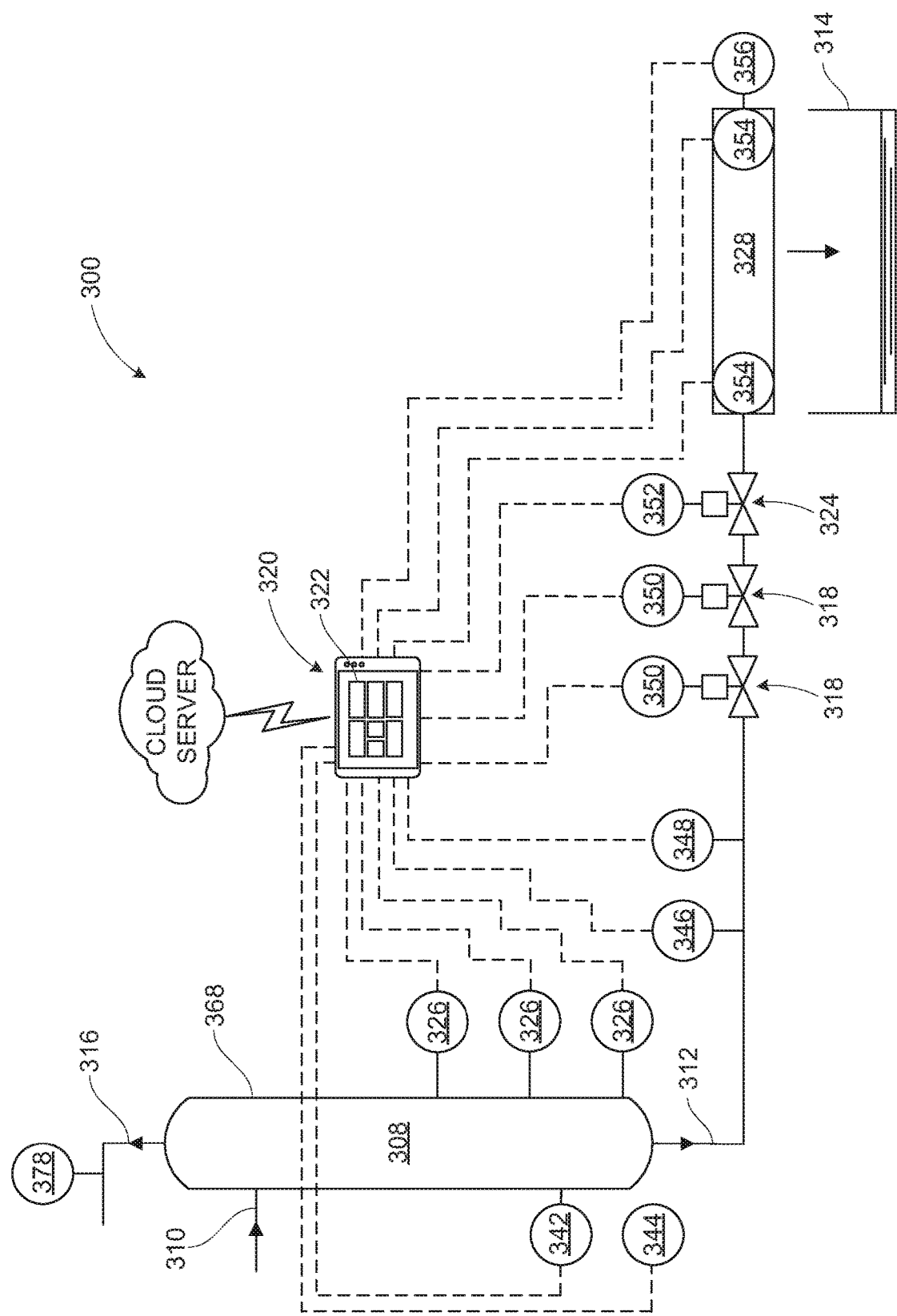
FIG. 3 is a schematic diagram of a frac sand separator system according another exemplary embodiment.
Figure 4:
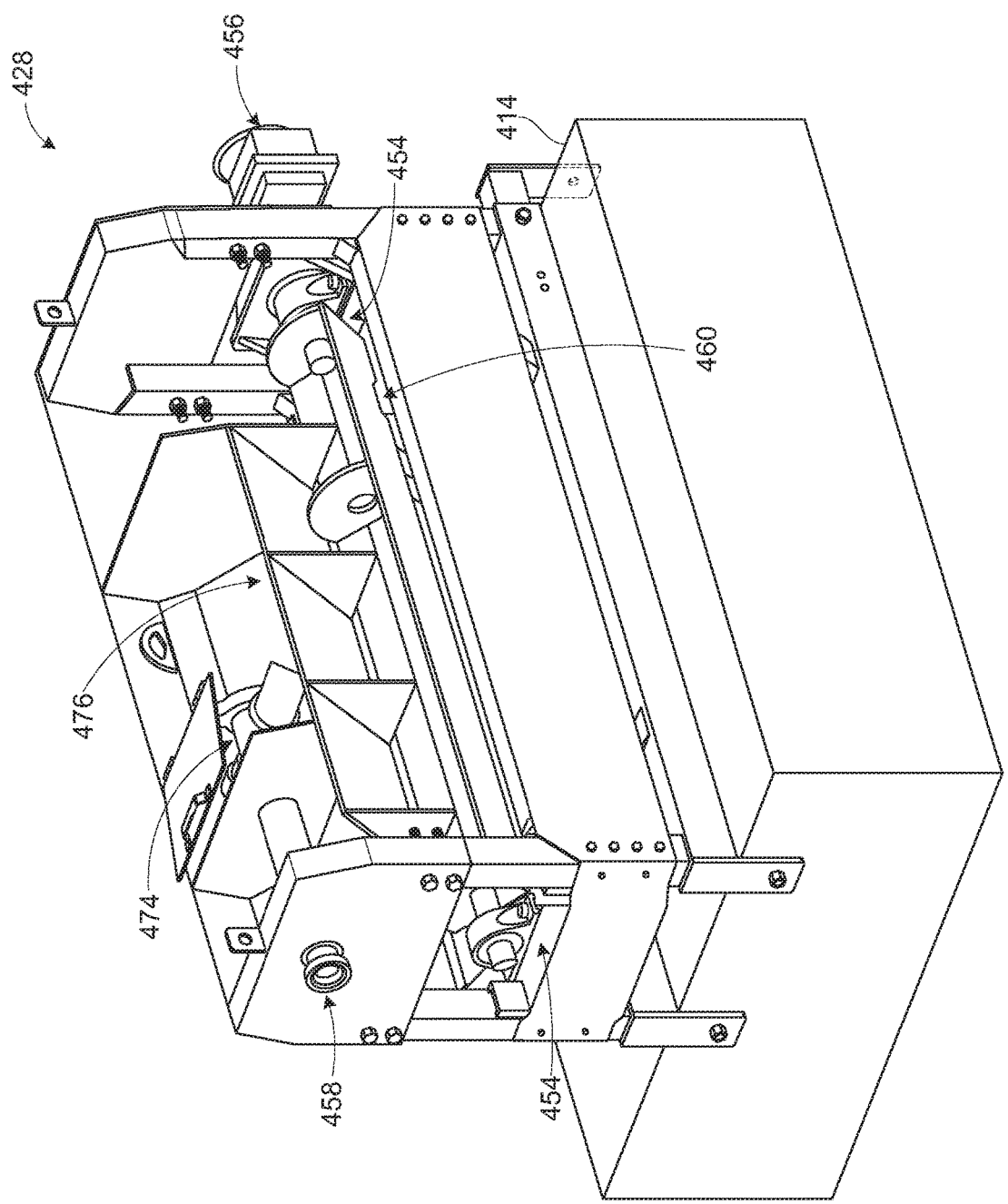
FIG. 4 is a perspective view of a sand scale according to an exemplary embodiment.

Referring now to FIG. 4, FIG. 4 illustrates a scale 428 according to an exemplary embodiment. The scale 428 represents one non-limiting example of a scale that may be used with the frac sand separator systems disclosed herein (e.g., the system 200 shown in FIG. 2, the system 300 shown in FIG. 3 and described below, etc.). As described above with reference to the scale 228 shown in FIG. 2, any other configuration of a sand scale may be provided in other embodiments, examples of which are described above with reference to: (1) retaining the particulate matter and allowing the water mixed therewith to drain; and (2) releasing the particulate matter into a collection container 414.

As shown in FIG. 4, the scale 428 includes an inlet 458 configured to be fluidly connected to the particulate outlet (e.g., the particulate outlet 212 shown in FIG. 2, the particulate outlet 312 shown in FIG. 3 and described below, etc.) of a sand separator (e.g., the sand separator 208 shown in FIG. 2, the sand separator 308 shown in FIG. 3 and described below, etc.). The scale 428 includes a diffuser 474 and a v-bottom tray 476. The v-bottom tray 476 includes a water drain 460. The diffuser 474, the v-bottom tray 476, and the water drain 460 separate the particulate matter from any water mixed therewith such that the particulate matter is retained by the v-bottom tray 476 while the water mixed therewith drains through the water drain 460.

The scale 428 includes one or more mass sensors 454 that weigh the particulate matter retained within the v-bottom tray 476. In the exemplary embodiment of the scale 428, the scale 428 includes an actuator 456 that is configured to rotate the v-bottom tray 476 to thereby release the particulate matter from the scale 428 and into the collection container 414.

Referring again to FIG. 2, the frac sand separator system 200 includes one or more outlet valves 218 fluidly connected between the particulate outlet 212 of the vessel 268 of the sand separator 208 and the collection container 214. Each outlet valve 218 is selectively moveable between: (1) an open position that enables the particulate matter (e.g., the slurry containing the particulate matter, etc.) released from the vessel 268 of the sand separator 208 to flow through the outlet valve 218 toward the collection container 214; and (2) a closed position that prevents the particulate matter released from the vessel 268 from flowing through the outlet valve 218 toward the collection container 214.

In the exemplary embodiment of the frac sand separator system 200, each outlet valve 218 includes a plug valve, but each outlet valve 218 additionally or alternatively includes any other type of valve that enables the outlet valve 218 to function as disclosed herein. Each outlet valve 218 may be moved between the open and closed positions using any type of analog and/or digital actuator (not shown, e.g., the actuator 350 shown in FIG. 3 and described below, etc.), such as, but not limited to, a hydraulic actuator, an electronic actuator, a pneumatic actuator, and/or the like. In some embodiments that use position reporting, the actuator of one or more of the outlet valves 218 includes an analog input and an analog output. Although two are shown, the frac sand separator system 200 may include any number of the outlet valves 218. In some examples, one or more of the outlet valves 218 is a redundant valve that is held in the open position during operation of the frac sand separator system 200 and is only moved to the closed position upon a failure, fault, and/or the like within the system 200.

The frac sand separator system 200 includes one or more choke valves 224 fluidly connected between the particulate outlet 212 of the vessel 268 of the sand separator 208 and the collection container 214. Each choke valve 224 is selectively moveable between an open position and a closed position for controlling the pressure and rate of discharge of the particulate matter (e.g., the slurry containing the particulate matter, etc.) from the particulate outlet 212 of the sand separator 208. For example, the choke valve 224 may reduce the pressure of the particulate matter exiting the vessel 268 of the sand separator 208 to manageable levels. Each choke valve 224 may be a variable or a fixed valve. In some embodiments, the frac sand separator system 200 includes one or more pressure sensors (not shown; e.g., the pressure sensor 348 shown in FIG. 3 and described below, etc.) to facilitate operation (e.g., use, etc.) of the choke valve(s) 224.

Each choke valve 224 may include any type of valve that enables the choke valve 224 to function as disclosed herein. Each choke valve 224 may be moved between the open and closed positions using any type of analog and/or digital actuator (not shown, e.g., the actuator 352 shown in FIG. 3 and described below, etc.), such as, but not limited to, a hydraulic actuator, an electronic actuator, a pneumatic actuator, a manual actuator, and/or the like. In some embodiments that use position reporting, the actuator of one or more of the choke valves 224 includes an analog input and an analog output. Although only one is shown, the frac sand separator system 200 may include any number of the choke valves 224.

The computing device 220 includes one or more processors 222 and optionally includes one or more memories (not shown). One specific non-limiting example of the computing device 220 includes a MISU Gen 2 control system. In some embodiments, the computing device 220 includes multiple processors, controllers, and/or the like (e.g., two or more MISU units, etc.). As shown in FIG. 2, the computing device 220 is operatively connected to the temperature sensors 226 for receiving measured temperatures therefrom. The computing device 220 is operatively connected to outlet valves 218 for controlling operation thereof, and more specifically for selectively moving the outlet valves 218 between the open and closed positions. Moreover, the computing device 220 is operatively connected to the choke valve 224 for controlling operation of the choke valve (e.g., for selectively moving the choke valve 224 between the open and closed positions, etc.). In some examples, the computing device 220 is operatively connected to the scale 228 (e.g., to the mass sensors 272, etc.) for receiving measured weights of the particulate matter discharged from the sand separator 208 into the collection container 214.

In some examples, the computing device 220 is operatively connected to the outlet valves 218, the choke valve 224, the temperature sensors 226, and/or the scale 228 using a wired connection. Moreover, in some examples, the computing device 220 is operatively connected to the outlet valves 218, the choke valve 224, the temperature sensors 226, and/or the scale 228 using a wireless connection (e.g., over a wireless local area network (LAN) such as Wi-Fi, over a wireless wide area network (WAN) such as the Internet and/or a cellular network, using BLUETOOTH branded communications, etc.). The computing device 220 may communicate with a remote computing device (e.g., a remote server, a remote database, a cloud service, etc.), for example to record information (e.g., data, etc.) on the remote server, to receive information (e.g., data, instructions, steps, logic, software, programming, etc.) from the remote server, and/or the like. In some examples, the computing device 220 is a remote computing device (e.g., a remote server, a computing device incorporated into a cloud service, another remote computing device, etc.) that is remote (e.g., offsite, etc.) from the remainder (e.g., the sand separator 208, the collection container 214, etc.) of the frac sand separator system 200. The computing device optionally includes a display (not shown) for displaying various parameters, settings, data, and/or the like of the frac sand separator system 200 (e.g., pressures, temperatures, choke valve settings, weights, masses, discharge rates, the time of the most recent emptying of the particulate matter from the sand separator 208, the time of an upcoming emptying of the particulate matter from the sand separator 208, an operational status of the system 200, etc.).

As briefly described above, the computing device 220 is configured to automatically control the outlet valves 218 to automatically empty the particulate matter from the sand separator 208. Specifically, the processor 222 of the computing device 220 is configured to automatically open one or more of the outlet valves 218 to thereby release the particulate matter (e.g., the slurry containing the particulate matter, etc.) from the vessel 268 of the sand separator 208 such that the particulate matter flows directly into the collection container 214 or flows into the scale 228 for eventual delivery to the collection container 214. The computing device 220 thereby automatically empties the particulate matter from the sand separator 208.

In some examples, the processor 222 is configured to automatically open one or more of the outlet valves 218 to thereby automatically empty the particulate matter from the sand separator 208 upon the passage of a predetermined amount of time. For example, the processor 222 may automatically empty the particulate matter from the sand separator 208 every five minutes, every ten minutes, every 15 minutes, etc. In some examples, the time interval between automatic emptying events performed by the processor 222 is variable, for example becoming less frequent as the fracturing operation continues over time and less particulate matter is returned from the well, etc.

In some examples, the processor 222 is configured to automatically open one or more of the outlet valves 218 to thereby automatically empty the particulate matter from the sand separator 208 based on a level of the particulate matter within the vessel 268 of the sand separator 208 (e.g., when the particulate matter reaches a predetermined maximum allowed level within the vessel 268, when the vessel 268 is ⅓rd full of particulate matter, when the vessel is half full of particulate matter, when the vessel 268 is ¾ full of particulate matter, etc.). For example, the processor 222 may automatically open one or more of the outlet valves 218 to thereby automatically empty the particulate matter from the sand separator 208 based on one or more measured temperatures received from one or more of the temperature sensors 226. Specifically, in some examples the processor 222 determines the level of the particulate matter within the vessel 268 based on one or more measured temperatures within the vessel 268 received from the temperature sensor(s) 226. When the level determined from the temperature(s) received from the temperature sensor(s) 226 equals or exceeds a predetermined level, the processor 222 automatically opens one or more of the outlet valves 218 to thereby automatically empty the particulate matter from the sand separator 208.

In one specific example, the processor 222 of the computing device determines whether to automatically empty the particulate matter from the sand separator 208 using two measured temperatures, namely: (1) a first measured temperature of water and/or the particulate matter at a first location within the vessel 268 that is below a predetermined maximum allowed level of the particulate matter; and (2) a second measured temperature of water at a second location within the vessel 268 that corresponds to the predetermined maximum allowed level of the particulate matter. For example, the processor 222 automatically opens one or more of the outlet valves 218 to thereby automatically empty the particulate matter from the sand separator 208 when the temperature differential between the first and second measured temperatures approaches zero (e.g., is less than a predetermined value).

In one specific example, the processor 222 of the computing device determines whether to automatically empty the particulate matter from the sand separator 208 using three measured temperatures, for example temperatures measured at a low, mid, and high levels (i.e., locations) within the vessel 268. The processor 222 compares at least some of the measured temperatures and automatically opens one or more of the outlet valves 218 to thereby automatically empty the particulate matter from the sand separator 208 when the temperature differentials trend toward a predetermined target value (e.g., within approximately 1%, within approximately 2%, within approximately 5%, within approximately 10%, within approximately 15%, within approximately 17%, within approximately 20%, etc.).

Once the particulate matter has been emptied from the vessel 268 of the sand separator 208, the processor 222 of the computing device 220 is configured to automatically close one or more of the outlet valves 218. In some examples, the processor 222 is configured to automatically close one or more of the outlet valves 218 upon the passage of a predetermined amount of time (e.g., after the outlet valve(s) 218 have been open for a predetermined period of time, etc.). For example, the processor 222 may automatically close the outlet valve(s) 218 after the outlet valves(s) 218 have been open for approximately 30 seconds, approximately one minute, approximately 2 minutes, approximately 5 minutes, etc. In other words, in such an example, the processor 222 is configured to leave the outlet valve(s) 218 open to thereby automatically empty the particulate matter from the sand separator 208 for a predetermined fixed amount of time.

But, in some examples, the amount of time that the outlet valve(s) 218 are open and thus the sand separator 208 is being emptied of the particulate matter is variable. For example, in some examples, the processor 222 is configured to automatically close one or more of the outlet valves 218 based on one or more measured temperatures of the vessel 268 received from one or more of the temperature sensors 226. Moreover, in some examples, the processor 222 is configured to automatically close one or more of the outlet valves 218 based on a level of the particulate matter within the vessel 268 of the sand separator 208 (e.g., determined by the processor 222 based on one or more measured temperatures of the vessel 268, etc.).

In some examples, the processor 222 of the computing device 220 is configured to record one or more weights measured by the scale 228 of the particulate matter discharged from the sand separator 208 into the collection container 214. Recorded weights may be stored locally onboard the computing device 220 by the processor 222, transmitted offsite to a remote computing device (e.g., a cloud service, a remote server, a remote database, etc.) by the processor 222, and/or displayed on a display of the computing device 220 by the processor 222.

In some examples, the processor 222 of the computing device 220 is configured to automatically control the pressure and/or rate of discharge of the particulate matter (e.g., the slurry containing the particulate matter, etc.) from the particulate outlet 212 of the sand separator 208, for example by automatically controlling the position of the choke valve 224. For example, the processor 222 may select the position of the choke valve 224 to reduce the pressure of the particulate matter exiting the vessel 268 of the sand separator 208. Moreover, and for example, the processor 222 may select the position of the choke valve 224 to control a pressure drop within the particulate outlet 212 of the sand separator 208 by minimizing a pressure drop to a predetermined value or less (e.g., approximately 700 psi or less, approximately 500 psi or less, approximately 300 psi or less, etc.). In other words, the processor 222 may control the choke valve 224 to prevent the pressure within the particulate outlet 212 from dropping more than a predetermined value (e.g., more than approximately 300 psi, more than approximately 500 psi, more than approximately 700 psi, etc.). In some examples, the processor 222 is configured to control the choke valve 224 (e.g., automatically open or close the choke valve 224, etc.) based on a pressure within the particulate outlet 212, for example a measured pressure received from a pressure sensor (e.g., the pressure sensor 348 shown in FIG. 3 and described below, etc.).

The automatic opening and closing of the outlet valves 218 of the frac sand separator system 200 performed by the computing device 220 provides a more reliable, less time-consuming, and/or less costly determination of when to empty the vessel of a sand separator. For example, the automatic operations and determinations performed by the computing device 220 reduce or eliminate the determinations and/or operations performed by a human operator during a fracturing operation, thereby reducing or eliminating human error, the amount of labor performed by operators, and/or the like.

FIG. 3 illustrates a frac sand separator system 300 according to an exemplary embodiment. The frac sand separator system 300 includes a sand separator 308, a collection container 314, and a computing device 320. The sand separator 308 includes a vessel 368 having an inlet 310 that is fluidly connected to a well (e.g., the well 102 shown in FIG. 1) for receiving a fracking return mixture from the well during fracturing operations. The sand separator 308 is configured to separate water of the fracking return mixture from particulate matter of the frac return mixture. As described above, in some examples some water remains with the particulate matter such that the sand separator 308 separates the fracking return mixture into water and a slurry that includes the particulate matter. The sand separator 308 includes a particulate outlet 312.

The collection container 314 is fluidly connected to the particulate outlet 312 for receiving the particulate matter (e.g., the slurry containing the particulate matter, etc.) from the vessel 368 of the sand separator 308. The frac sand separator system 300 includes one or more outlet valves 318 fluidly connected between the particulate outlet 312 and the collection container 314 for releasing the particulate matter from the vessel 368 of the sand separator 308 to thereby empty the vessel 368. The computing device 320 is operatively connected to one or more of the outlet valves 318 for automatic control of the outlet valve(s) 318 to automatically empty the particulate matter from the vessel 368 of the sand separator 308, as will be described below. The vessel 368 of the sand separator 308 includes a water outlet 316 that is fluidly connected to a frac tank (not shown, e.g., the frac tank 232 shown in FIG. 2, etc.) for removing the water that has been separated from the particulate matter of the fracking return mixture from the vessel 368.

The sand separator 308 may include any type of separator that is configured to separate the water of the fracking return fluid from the particulate matter of the fracking return fluid. For example, in some embodiments the sand separator is a cyclonic separator that is configured to force the particulate matter of the fracking return mixture to the bottom of the vessel 368, while the water of the fracking return mixture is removed from the top of the vessel 368 via the water outlet 316. Other types of separators are used in other embodiments.

The frac sand separator system 300 includes one or more temperature sensors 326 operatively connected to the vessel 368 of the sand separator 308 for measuring one or more temperatures within the vessel 368. The temperature sensor(s) 326 can be located at various locations along the vessel 368 for measuring one or more temperatures that indicates a level of the particulate matter (e.g., the slurry containing the particulate matter, etc.) within the vessel 368. The frac sand separator system 300 includes any number of the temperature sensors 326. In the exemplary embodiment of the system 300, three of the temperature sensors 326 are provided for measuring the temperatures at three different locations within the vessel 368, for example a low level, a mid-level, and a high level within the vessel 368. In another example, two temperature sensors 326 are provided for measuring: (1) the temperature of water and/or the particulate matter (e.g., the slurry containing the particulate matter, etc.) at a first location within the vessel 368 (e.g., a location below a maximum allowed level of the particulate matter, etc.); and (2) the temperature of water at a second location within the vessel 368 that corresponds to the maximum allowed level of the particulate matter. Yet another example includes using a single temperature sensor 326 for measuring the temperature within the vessel 368 at a single location, for example at a location that corresponds to a maximum allowed level of the particulate matter.

Each temperature sensor 326 may include any type of analog and/or digital sensor configured to measure one or more temperatures within the vessel 368 of the sand separator 308, such as, but not limited to, a thermocouple, a thermometer, and/or the like. In some examples, one or more of the temperature sensors 326 is a 20 milliampere (mA) sensor.

Optionally, a scale 328 is fluidly connected between the particulate outlet 312 of the sand separator 308 and the collection container 314 for measuring the weight of the particulate matter (e.g., the slurry containing the particulate matter, etc.) released from the vessel 368 of the sand separator 308 through the particulate outlet 312. Specifically, the particulate matter released from the particulate outlet 312 enters the scale 328, which separates the particulate matter from any water mixed therewith (e.g., water of a slurry containing the particulate matter, etc.), for example by filtration, diffusion, gravity, and/or the like. Any type of structure, geometry, device, and/or the like may be used to retain the particulate matter and allow the water mixed therewith to drain, such as, but not limited to, a flat, round, half cylinder, v-bottom, bird/bath vortex geometries, and/or the like.

Once the water has adequately drained, one or more mass sensors 354 of the scale 328 weigh the retained particulate matter. The scale 328 may include any number of the mass sensors 354. Each mass sensor 354 may include any type of analog and/or digital sensor, such as, but not limited to, a load cell, a strain gage, a displacement-based sensor, a pressure-based sensor, and/or the like.

Once weighed, the scale 328 releases (e.g., dumps, etc.) the particulate matter into the collection container 314. Any type of structure, geometry, motion, device, and/or the like may be used to release the particulate matter from the scale 328 into the collection container 314, such as, but not limited to, rotating, inverting, opening, scraping, tilting, and/or the like the scale 328. An exemplary actuator 356 is shown in FIG. 3 for actuating the scale 328 to release the particulate matter into the collection container 314. The collection container 314 optionally includes one or more level sensors (not shown, e.g., the level sensor 230 shown in FIG. 2, etc.) for measuring a level of the particulate matter within the collection container 314. The level sensor(s) may include any type of analog and/or digital sensor configured to determine the level of particulate matter within the collection container 314, such as, but not limited to, a nuclear densometer, an acoustic sensor, a radar sensor, and/or the like. In some examples, the collection container 314 is at atmospheric pressure.

The frac sand separator system 300 includes one or more outlet valves 318 fluidly connected between the particulate outlet 312 of the vessel 368 of the sand separator 308 and the collection container 314. Each outlet valve 318 is selectively moveable between: (1) an open position that enables the particulate matter (e.g., the slurry containing the particulate matter, etc.) released from the vessel 368 of the sand separator 308 to flow through the outlet valve 318 toward the collection container 314; and (2) a closed position that prevents the particulate matter released from the vessel 368 from flowing through the outlet valve 318 toward the collection container 314.

In the exemplary embodiment of the frac sand separator system 300, each outlet valve 318 includes a plug valve, but each outlet valve 318 additionally or alternatively includes any other type of valve that enables the outlet valve 318 to function as disclosed herein. Each outlet valve 318 may be moved between the open and closed positions using any type of analog and/or digital actuator 350, such as, but not limited to, a hydraulic actuator, an electronic actuator, a pneumatic actuator, and/or the like. In some embodiments that use position reporting, the actuator 350 of one or more of the outlet valves 318 includes an analog input and an analog output. Although two are shown, the frac sand separator system 300 may include any number of the outlet valves 318. In some examples, one or more of the outlet valves 318 is a redundant valve that is held in the open position during operation of the frac sand separator system 300 and is only moved to the closed position upon a failure, fault, and/or the like within the system 300.

The frac sand separator system 300 includes one or more choke valves 324 fluidly connected between the particulate outlet 312 of the vessel 368 of the sand separator 308 and the collection container 314. Each choke valve 324 is selectively moveable between an open position and a closed position for controlling the pressure and rate of discharge of the particulate matter (e.g., the slurry containing the particulate matter, etc.) from the particulate outlet 312 of the sand separator 308. For example, the choke valve 324 may reduce the pressure of the particulate matter exiting the vessel 368 of the sand separator 308 to manageable levels. Each choke valve 324 may be a variable or a fixed valve.

Each choke valve 324 may include any type of valve that enables the choke valve 324 to function as disclosed herein. Each choke valve 324 may be moved between the open and closed positions using any type of analog and/or digital actuator 352, such as, but not limited to, a hydraulic actuator, an electronic actuator, a pneumatic actuator, a manual actuator, and/or the like. In some embodiments that use position reporting, the actuator 352 of one or more of the choke valves 324 includes an analog input and an analog output. Although only one is shown, the frac sand separator system 300 may include any number of the choke valves 324.

In the exemplary embodiment, the frac sand separator system 300 includes one or more analog and/or digital pressure sensors 348, for example to facilitate operation (e.g., use, etc.) of the choke valve(s) 324. The pressure sensor 348 is fluidly connected between the outlet 312 of the sand separator 308 and the outlet valve(s) 318 for measuring the pressure within the outlet 318 upstream from the outlet valve(s) 318. In addition or alternatively, the frac sand separator system 300 includes a pressure sensor 348 fluidly connected between the outlet valve(s) 318 and the collection container 314 for measuring a pressure within the particulate outlet 312 downstream from the outlet valve(s) 318. Each pressure sensor 348 includes any type of pressure sensor that enables the pressure sensor 348 to function as disclosed herein. In some examples, one or more of the pressure sensors 348 is a 20 mA sensor. Although only one is shown, the frac sand separator system 300 may include any number of the pressure sensors 348.

The frac sand separator system 300 includes one or more level sensors 342 operatively connected to the vessel 368 of the sand separator 308 such that the level sensor 342 is configured to measure a level of the particulate matter within the vessel 368. The level sensor(s) 342 may include any type of analog and/or digital sensor, such as, but not limited to, a nuclear densometer, an acoustic sensor, a radar sensor, and/or the like. Although only one is shown, the frac sand separator system 300 may include any number of the level sensors 342.

The frac sand separator system 300 includes one or more mass sensors 344 operatively connected to the vessel 368 of the sand separator 308 such that the mass sensor 344 is configured to measure a mass of the vessel 368. The frac sand separator system 300 may include any number of the mass sensors 344. Each mass sensor 344 may include any type of analog and/or digital sensor, such as, but not limited to, a load cell, a strain gage, a displacement-based sensor, a pressure-based sensor, and/or the like.

As shown in FIG. 3, the frac sand separator system 300 includes one or more particulate sensors 346 fluidly connected to the particulate outlet 312 such that the particulate sensor 346 is configured to detect particulate matter within the particulate outlet 312. In some examples, the frac sand separator system 300 includes one or more particulate sensors 378 fluidly connected to the water outlet 316 such that the particulate sensor 378 is configured to detect particulate matter within the water outlet 316. Each particulate sensor 346 and each particulate sensor 378 may include any type of analog and/or digital sensor, such as, but not limited to, an acoustic sensor, a vibration sensor, an erosion sensor, a densometer, and/or the like. Although only one of each is shown, the frac sand separator system 300 may include any number of the particulate sensors 346 and any number of the particulate sensors 378.

Figure 5:
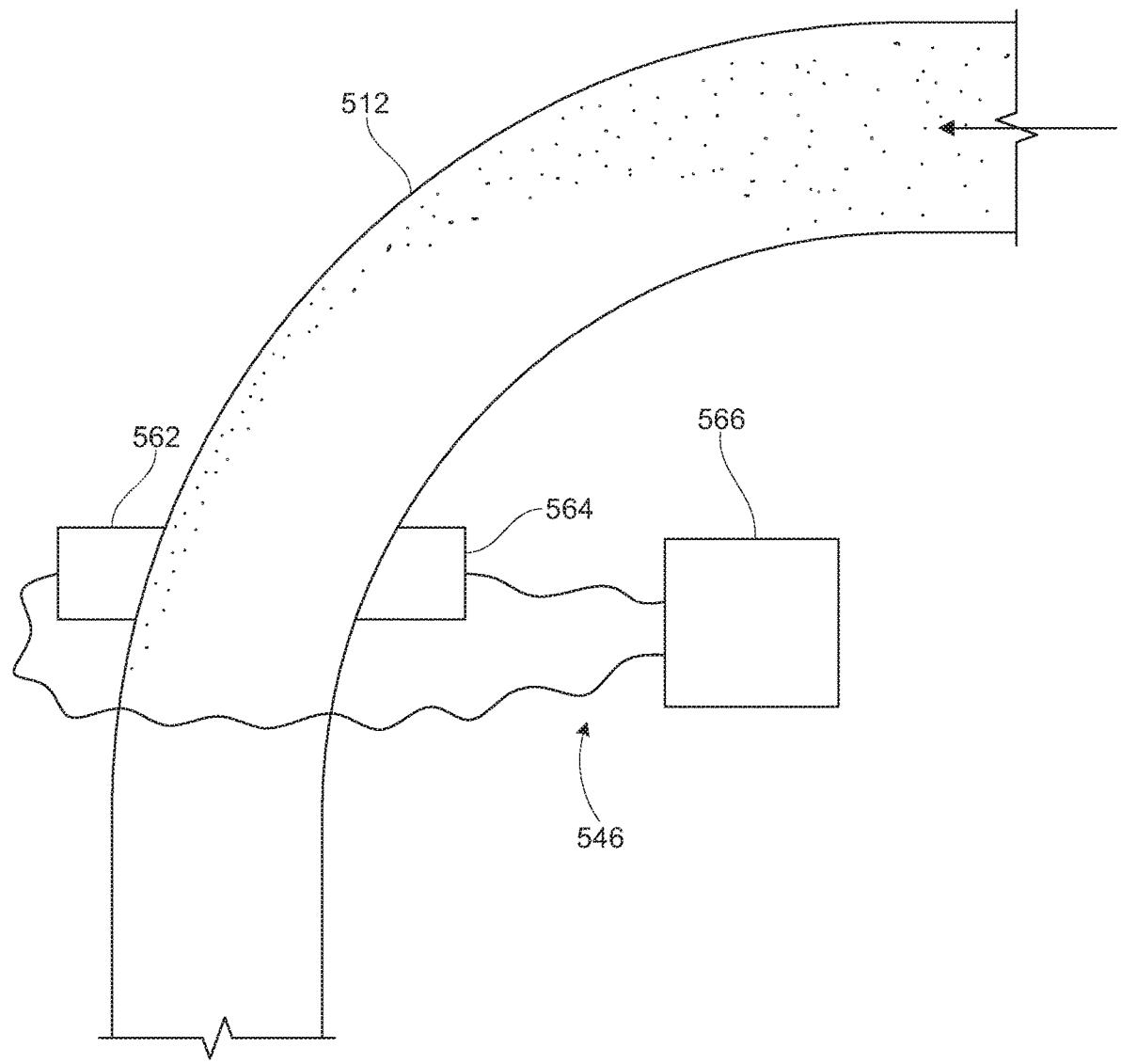
FIG. 5 is a schematic diagram of a particulate sensor arrangement according to an exemplary embodiment.

Referring now to FIG. 5, FIG. 5 illustrates a particulate sensor arrangement 546 according to an exemplary embodiment. The arrangement 546 represents one non-limiting example of a particulate sensor that may be used with the frac sand separator systems disclosed herein (e.g., the system 200 shown in FIG. 2, the system 300 shown in FIG. 3, etc.). Any other configuration, arrangement, and/or the like of one or more particulate sensors may be provided in other embodiments.

The particulate sensor arrangement 546 includes two particulate sensors 562 and 564 arranged on opposite sides of a conduit 512 after a bend in the conduit 512. The particulate sensor arrangement 546 also includes a data acquisition device 566. Each of the sensors 562 and 564 will detect vibration and/or acoustic noise caused by particulate impact against the internal wall of the conduit 512. But, the particulate sensor 562 will detect a stronger signal such that the sensor 564 can be used to measure and/or remove background noise and thereby mathematically isolate the particulate signal in time and/or frequency domain.

Referring again to FIG. 3, the computing device 320 includes one or more processors 322 and optionally includes one or more memories (not shown). One specific non-limiting example of the computing device 320 includes a MISU Gen 2 control system. In some embodiments, the computing device 320 includes multiple processors, controllers, and/or the like (e.g., two or more MISU units, etc.). As shown in FIG. 3, the computing device 320 is operatively connected to the temperature sensors 326 for receiving measured temperatures therefrom. The computing device 320 is operatively connected to the pressure sensor 348 for receiving measured pressures therefrom. The computing device 320 is also operatively connected to the level sensor 342 and the mass sensor 344 for receiving measured levels and masses, respectively, therefrom. As is also shown in FIG. 3, the computing device 32 is operatively connected to the particulate sensors 346 and 378 for receiving detected particulate amounts therefrom.

The computing device 320 is operatively connected to outlet valves 318 for controlling operation thereof, and more specifically for selectively moving the outlet valves 318 between the open and closed positions. Moreover, the computing device 320 is operatively connected to the choke valve 324 for controlling operation of the choke valve (e.g., for selectively moving the choke valve 324 between the open and closed positions, etc.). In some examples, the computing device 320 is operatively connected to the scale 328 (e.g., to the mass sensors 354, etc.) for receiving measured weights of the particulate matter discharged from the sand separator 308 into the collection container 314.

In some examples, the computing device 320 is operatively connected to the outlet valves 318, the choke valve 324, the temperature sensors 326, the level sensor 342, the mass sensor 344, the pressure sensor 348, the particulate sensors 346 and/or 378, and/or the scale 328 using a wired connection. Moreover, in some examples, the computing device 320 is operatively connected to the outlet valves 318, the choke valve 324, the temperature sensors 326, the level sensor 342, the mass sensor 344, the pressure sensor 348, the particulate sensors 346 and/or 378, and/or the scale 328 using a wireless connection (e.g., over a wireless local area network (LAN) such as Wi-Fi, over a wireless wide area network (WAN) such as the Internet and/or a cellular network, using BLUETOOTH branded communications, etc.). The computing device 320 may communicate with a remote computing device (e.g., a remote server, a remote database, a cloud service, etc.), for example to record information (e.g., data, etc.) on the remote server, to receive information (e.g., data, instructions, steps, logic, software, programming, etc.) from the remote server, and/or the like. In some examples, the computing device 320 is a remote computing device (e.g., a remote server, a computing device incorporated into a cloud service, another remote computing device, etc.) that is remote (e.g., offsite, etc.) from the remainder (e.g., the sand separator 308, the collection container 314, etc.) of the frac sand separator system 200. The computing device optionally includes a display (not shown) for displaying various parameters, settings, data, and/or the like of the frac sand separator system 300 (e.g., pressures, temperatures, choke valve settings, weights, masses, particulate amounts, levels, discharge rates, the time of the most recent emptying of the particulate matter from the sand separator 308, the time of an upcoming emptying of the particulate matter from the sand separator 308, an operational status of the system 300, etc.).

As briefly described above, the computing device 320 is configured to automatically control the outlet valves 318 to automatically empty the particulate matter from the sand separator 308. Specifically, the processor 322 of the computing device 320 is configured to automatically open one or more of the outlet valves 318 to thereby release the particulate matter (e.g., the slurry containing the particulate matter, etc.) from the vessel 368 of the sand separator 308 such that the particulate matter flows directly into the collection container 314 or flows into the scale 328 for eventual delivery to the collection container 314. The computing device 320 thereby automatically empties the particulate matter from the sand separator 308.

In some examples, the processor 322 is configured to automatically open one or more of the outlet valves 318 to thereby automatically empty the particulate matter from the sand separator 308 upon the passage of a predetermined amount of time. For example, the processor 322 may automatically empty the particulate matter from the sand separator 308 every five minutes, every ten minutes, every 15 minutes, etc. In some examples, the time interval between automatic emptying events performed by the processor 322 is variable, for example becoming less frequent as the fracturing operation continues over time and less particulate matter is returned from the well, etc.

In some examples, the processor 322 is configured to automatically open one or more of the outlet valves 318 to thereby automatically empty the particulate matter from the sand separator 308 based on a mass of the vessel 368 of the sand separator 308 (e.g., based on a change in the total mass of the vessel 368, based on a level of the particulate matter within the vessel 368 determined from a measured mass of the vessel 368, when a measured mass of the vessel 368 equals or exceeds a predetermined mass, etc.). For example, the processor 322 may automatically open one or more of the outlet valves 318 to thereby automatically empty the particulate matter from the sand separator 308 based on a measured mass of the vessel 368 received from the mass sensor 344.

In some examples, the processor 322 is configured to automatically open one or more of the outlet valves 318 to thereby automatically empty the particulate matter from the sand separator 308 based on a level of the particulate matter within the vessel 368 of the sand separator 308 (e.g., when the particulate matter reaches a predetermined maximum allowed level within the vessel 368, when the vessel 368 is ⅓rd full of particulate matter, when the vessel is half full of particulate matter, when the vessel 368 is ¾ full of particulate matter, etc.). For example, the processor 322 may automatically open one or more of the outlet valves 318 to thereby automatically empty the particulate matter from the sand separator 308 based on a measured level of the particulate matter within the vessel 368 received from the level sensor 342.

In another example, the processor 322 may automatically open one or more of the outlet valves 318 to thereby automatically empty the particulate matter from the sand separator 308 based on one or more measured temperatures received from one or more of the temperature sensors 326. Specifically, in some examples the processor 322 determines the level of the particulate matter within the vessel 368 based on one or more measured temperatures within the vessel 368 received from the temperature sensor(s) 326. When the level determined from the temperature(s) received from the temperature sensor(s) 326 equals or exceeds a predetermined level, the processor 322 automatically opens one or more of the outlet valves 318 to thereby automatically empty the particulate matter from the sand separator 308.

In one specific example, the processor 322 of the computing device determines whether to automatically empty the particulate matter from the sand separator 308 using two measured temperatures, namely: (1) a first measured temperature of water and/or the particulate matter at a first location within the vessel 368 that is below a predetermined maximum allowed level of the particulate matter; and (2) a second measured temperature of water at a second location within the vessel 368 that corresponds to the predetermined maximum allowed level of the particulate matter. For example, the processor 322 automatically opens one or more of the outlet valves 318 to thereby automatically empty the particulate matter from the sand separator 308 when the temperature differential between the first and second measured temperatures approaches zero (e.g., is less than a predetermined value).

In one specific example, the processor 322 of the computing device determines whether to automatically empty the particulate matter from the sand separator 308 using three measured temperatures, for example temperatures measured at a low, mid, and high levels (i.e., locations) within the vessel 368. The processor 322 compares at least some of the measured temperatures and automatically opens one or more of the outlet valves 318 to thereby automatically empty the particulate matter from the sand separator 308 when the temperature differentials trend toward a predetermined target value (e.g., within approximately 1%, within approximately 2%, within approximately 5%, within approximately 10%, within approximately 15%, within approximately 17%, within approximately 20%, etc.).

In some examples, the processor 322 is configured to automatically open one or more of the outlet valves 318 to thereby automatically empty the particulate matter from the sand separator 308 based on whether particulate matter is detected within the water outlet 316 by the particulate sensor 378 (e.g., which may indicate that the vessel 368 is full of particulate matter, etc.).

Once the particulate matter has been emptied from the vessel 368 of the sand separator 308, the processor 322 of the computing device 320 is configured to automatically close one or more of the outlet valves 318. In some examples, the processor 322 is configured to automatically close one or more of the outlet valves 318 upon the passage of a predetermined amount of time (e.g., after the outlet valve(s) 318 have been open for a predetermined period of time, etc.). For example, the processor 322 may automatically close the outlet valve(s) 318 after the outlet valves(s) 318 have been open for approximately 30 seconds, approximately one minute, approximately 2 minutes, approximately 5 minutes, etc. In other words, in such an example, the processor 322 is configured to leave the outlet valve(s) 318 open to thereby automatically empty the particulate matter from the sand separator 308 for a predetermined fixed amount of time.

But, in some examples, the amount of time that the outlet valve(s) 318 are open and thus the sand separator 308 is being emptied of the particulate matter is variable. For example, in some examples, the processor 322 is configured to automatically close one or more of the outlet valves 318 based on: (1) one or more measured temperatures of the vessel 368 received from one or more of the temperature sensors 326; (2) one or more measured masses of the vessel 368 received from the mass sensor 344; (3) a measured pressure within the particulate outlet 312 received from the pressure sensor 348; and/or (4) an amount of particulate matter detected within the particulate outlet 312 by the particulate sensor 346. Moreover, in some examples, the processor 322 is configured to automatically close one or more of the outlet valves 318 based on a level of the particulate matter within the vessel 368 of the sand separator 308 (e.g., a measured level received from the level sensor 342, determined by the processor 322 based on one or more measured temperatures of the vessel 368, etc.).

In some examples, the processor 322 of the computing device 320 is configured to record one or more weights measured by the scale 328 of the particulate matter discharged from the sand separator 308 into the collection container 314. Recorded weights may be stored locally onboard the computing device 320 by the processor 322, transmitted offsite to a remote computing device (e.g., a cloud service, a remote server, a remote database, etc.) by the processor 322, and/or displayed on a display of the computing device 320 by the processor 322.

In some examples, the processor 322 of the computing device 320 is configured to automatically control the pressure and/or rate of discharge of the particulate matter (e.g., the slurry containing the particulate matter, etc.) from the particulate outlet 312 of the sand separator 308, for example by automatically controlling the position of the choke valve 324. For example, the processor 322 may select the position of the choke valve 324 to reduce the pressure of the particulate matter exiting the vessel 368 of the sand separator 308. Moreover, and for example, the processor 322 may select the position of the choke valve 324 to control a pressure drop within the particulate outlet 312 of the sand separator 308 by minimizing a pressure drop to a predetermined value or less (e.g., approximately 700 psi or less, approximately 500 psi or less, approximately 300 psi or less, etc.). In other words, the processor 322 may control the choke valve 324 to prevent the pressure within the particulate outlet 312 from dropping more than a predetermined value (e.g., more than approximately 300 psi, more than approximately 500 psi, more than approximately 700 psi, etc.). In some examples, the processor 322 is configured to control the choke valve 324 (e.g., automatically open or close the choke valve 324, etc.) based on a pressure within the particulate outlet 312, for example a measured pressure received from the pressure sensor 348, etc.).

The automatic opening and closing of the outlet valves 318 of the frac sand separator system 300 performed by the computing device 320 provides a more reliable, less time-consuming, and/or less costly determination of when to empty the vessel of a sand separator. For example, the automatic operations and determinations performed by the computing device 320 reduce or eliminate the determinations and/or operations performed by a human operator during a fracturing operation, thereby reducing or eliminating human error, the amount of labor performed by operators, and/or the like.

Figure 6:
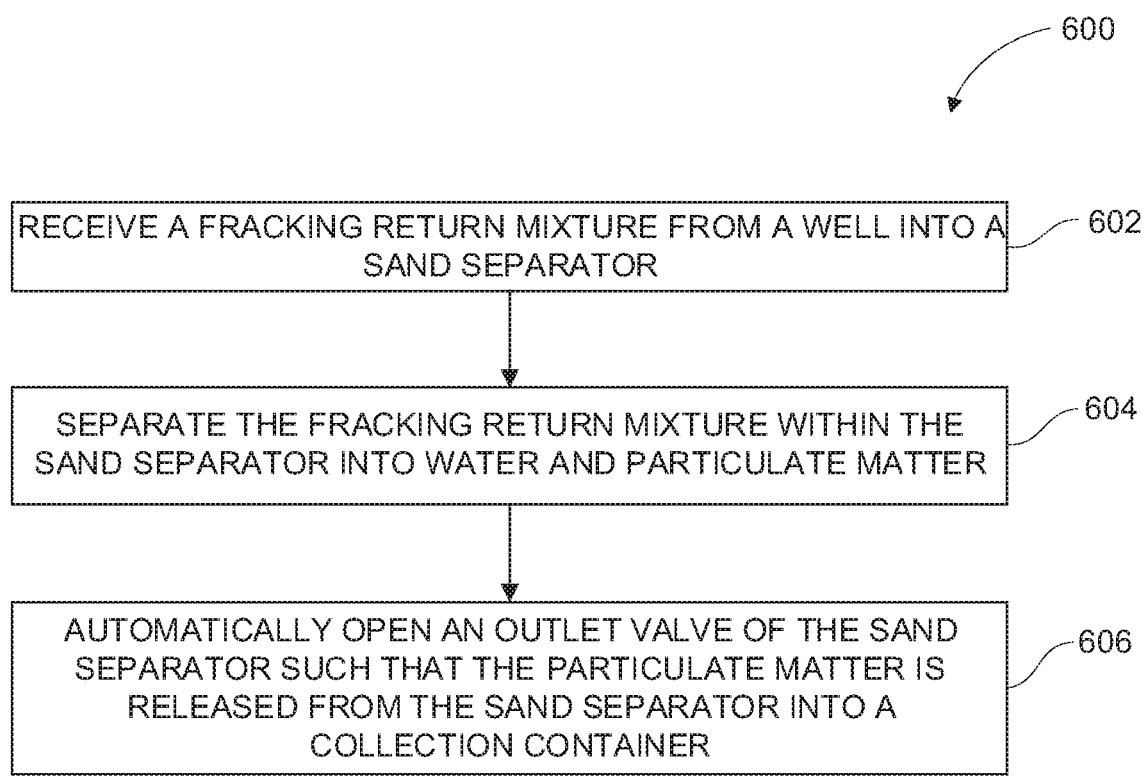
FIG. 6 is a flowchart illustrating a method for automatically emptying a sand separator according to an exemplary embodiment.

FIG. 6 is a flowchart illustrating a method 600 for automatically emptying a sand separator according to an exemplary embodiment. At 602, the method 600 includes receiving a fracking return mixture from a well into a sand separator. The method 600 includes separating, at 604, the fracking return mixture within the sand separator into water and particulate matter. At 606, the method 600 includes automatically opening an outlet valve of the sand separator such that the particulate matter is released from the sand separator into a collection container.

Figure 7:
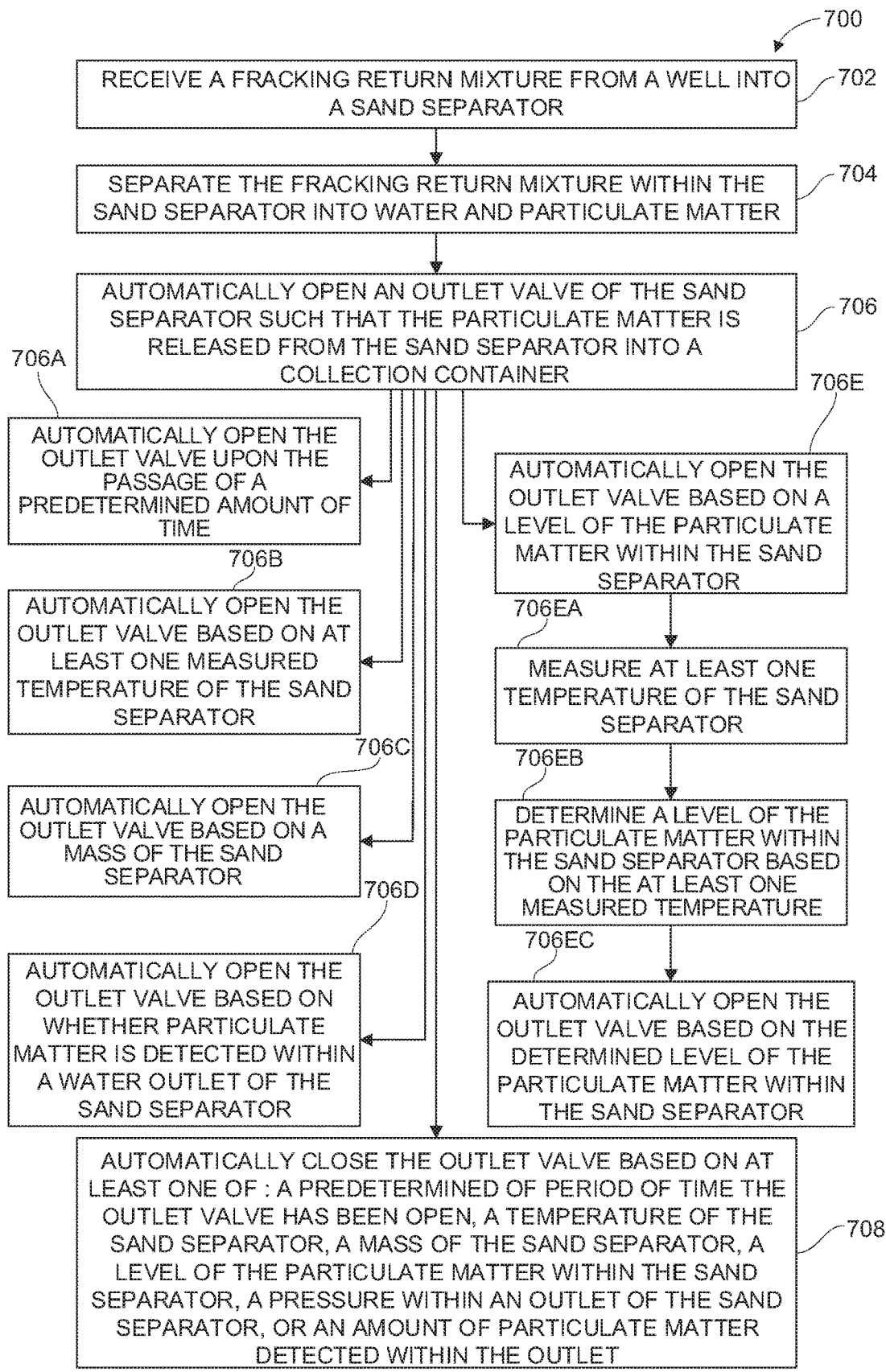
FIG. 7 is a flowchart illustrating a method for automatically emptying a sand separator according to another exemplary embodiment.

FIG. 7 is a flowchart illustrating a method 700 for automatically emptying a sand separator according to an exemplary embodiment. At 702, the method 700 includes receiving a fracking return mixture from a well into a sand separator. At 704, the method 600 includes separating the fracking return mixture within the sand separator into water and particulate matter. The method 700 includes automatically opening, at 706, an outlet valve of the sand separator such that the particulate matter is released from the sand separator into a collection container.

In some examples, automatically opening, at 706, the outlet valve of the sand separator includes comprises automatically opening, at 706a, the outlet valve upon the passage of a predetermined amount of time. Some examples of automatically opening, at 706, the outlet valve of the sand separator include automatically opening, at 706b, the outlet valve based on at least one measured temperature of the sand separator. In some examples, automatically opening, at 706, the outlet valve of the sand separator includes automatically opening, at 706c, the outlet valve based on a mass of the sand separator. Moreover, some examples of automatically opening, at 706, the outlet valve of the sand separator include automatically opening, at 706d, the outlet valve based on whether particulate matter is detected within a water outlet of the sand separator.

In some examples, automatically opening, at 706, the outlet valve of the sand separator includes automatically opening, at 706e, the outlet valve based on a level of the particulate matter within the sand separator. Optionally, the level of the particulate matter within the sand separator is determined using one or more measured temperatures of the sand separator. For example, some examples of automatically opening, at 706e, the outlet valve based on a level of the particulate matter within the sand separator include: measuring, at 706ea, at least one temperature of the sand separator; determining, at 706eb, a level of the particulate matter within the sand separator based on the at least one measured temperature; and automatically opening, at 706ec, the outlet valve based on the determined level of the particulate matter within the sand separator.

Optionally, the method 700 includes automatically closing, at 708, the outlet valve based on at least one of: a predetermined period of time the outlet valve has been open, a temperature of the sand separator, a mass of the sand separator, a level of the particulate matter within the sand separator, a pressure within an outlet of the sand separator, or an amount of sand detected within the outlet.

Figure 8:
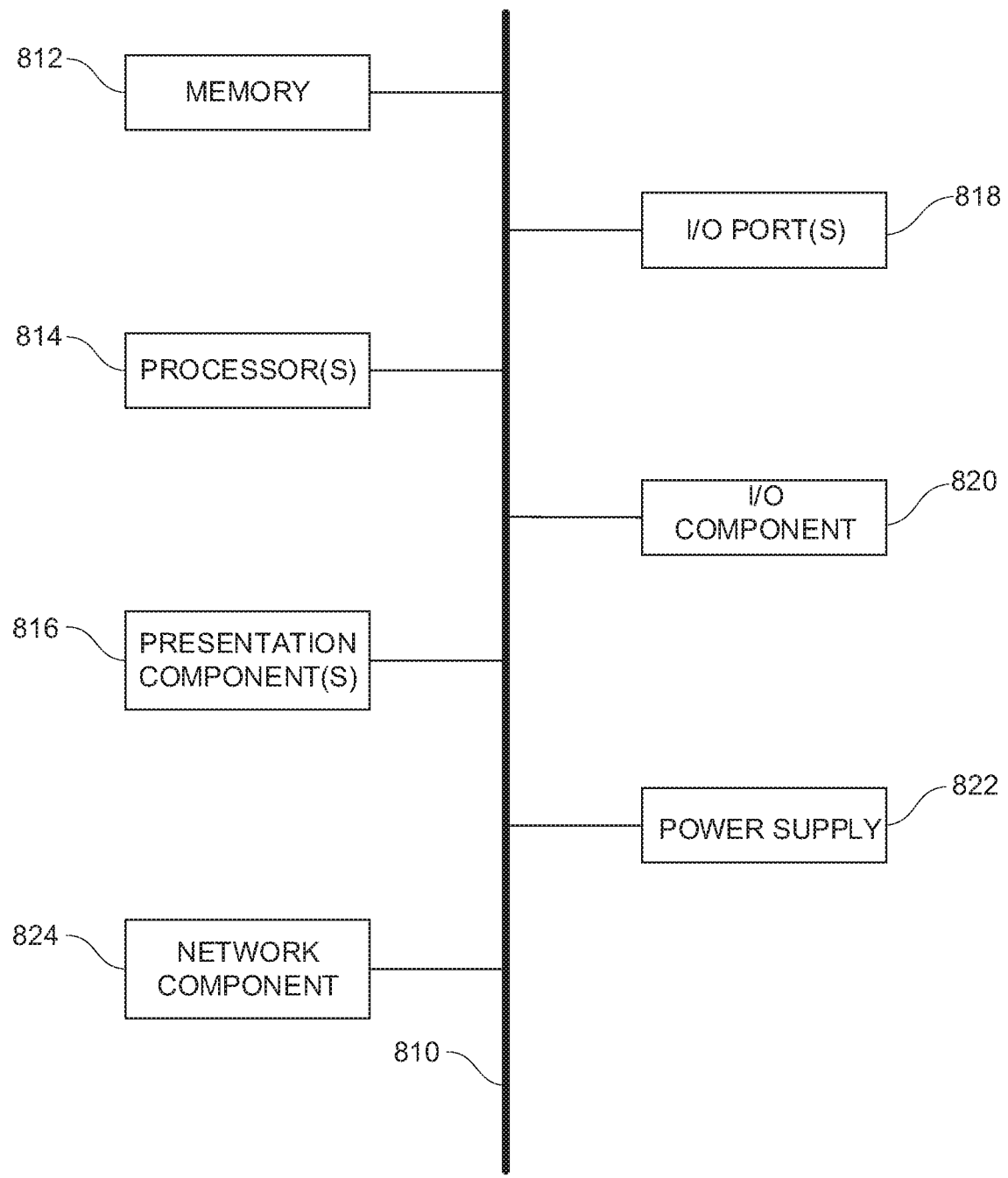
FIG. 8 is a block diagram of an example computing environment suitable for implementing the various examples disclosed herein.

FIG. 8 is a block diagram of an example computing device 800 (e.g., the computing device 220 shown in FIG. 2, the computing device 320 shown in FIG. 3, etc.) for implementing aspects, embodiments, and examples disclosed herein. Computing device 800 is but one example of a suitable computing environment and is not intended to suggest any limitation as to the scope of use or functionality of the invention. Neither should the computing device 800 be interpreted as having any dependency or requirement relating to any one or combination of components/modules illustrated.

The aspects, examples, and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments, such as those disclosed in FIG. 9 described in more detail below, where tasks are performed by remote-processing devices that are linked through a communications network.

Computing device 800 includes a bus 810 that directly or indirectly couples the following devices: memory 812, one or more processors 814, one or more presentation components 816, input/output (I/O) ports 818, I/O components 820, a power supply 822, and a network component 824. Computing device 800 should not be interpreted as having any dependency or requirement related to any single component or combination of components illustrated therein. While computing device 800 is depicted as a seemingly single device, multiple computing devices 800 may work together and share the depicted device resources. For instance, memory 812 may be distributed across multiple devices, processor(s) 814 may provide housed on different devices, and so on.

Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and the diagram of FIG. 8 is merely illustrative of an exemplary computing device that can be used in connection with one or more aspects, examples, and embodiments disclosed herein. Distinction is not made between such categories as "workstation," "server," "laptop," "hand-held device," etc., as all are contemplated within the scope of FIG. 8 and the references herein to a "computing device".

Memory 812 may include any of the of the computer-readable media discussed below in the section captioned "Exemplary Operating Environment". Memory 812 may be used to store and access instructions configured to carry out the various operations disclosed herein. In some examples, memory 812 includes computer-storage media in the form of volatile and/or nonvolatile memory, removable or nonremovable memory, data disks in virtual environments, or a combination thereof.

Processor(s) 814 may include any quantity of processing units that read data from various entities, such as memory 812 or I/O components 820. Specifically, processor(s) 814 are programmed to execute computer-executable instructions for implementing examples, embodiments, and aspects of the disclosure. The instructions may be performed by the processor, by multiple processors within the computing device 800, or by a processor external to the client computing device 800. In some examples, the processor(s) 814 are programmed to execute instructions such as those illustrated in the flowcharts discussed above and depicted in the accompanying drawings. Moreover, in some examples, the processor(s) 814 represent an implementation of analog techniques to perform the operations described herein. For example, the operations may be performed by an analog client computing device 800 and/or a digital client computing device 800.

Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 800, across a wired connection, or in other ways.

Ports 818 allow computing device 800 to be logically coupled to other devices including I/O components 820, some of which may be built in. Examples I/O components 820 include, for example but without limitation, a microphone, joystick, game pad, satellite dish, scanner, printer, wireless device, etc.

In some examples, the network component 824 includes a network interface card and/or computer-executable instructions (e.g., a driver) for operating the network interface card. Communication between the computing device 800 and other devices may occur using any protocol or mechanism over any wired or wireless connection. In some examples, the network component 824 is operable to communicate data over public, private, or hybrid (public and private) using a transfer protocol, between devices wirelessly using short range communication technologies (e.g., near-field communication (NFC), BLUETOOTH branded communications, or the like), or a combination thereof.

Figure 9:
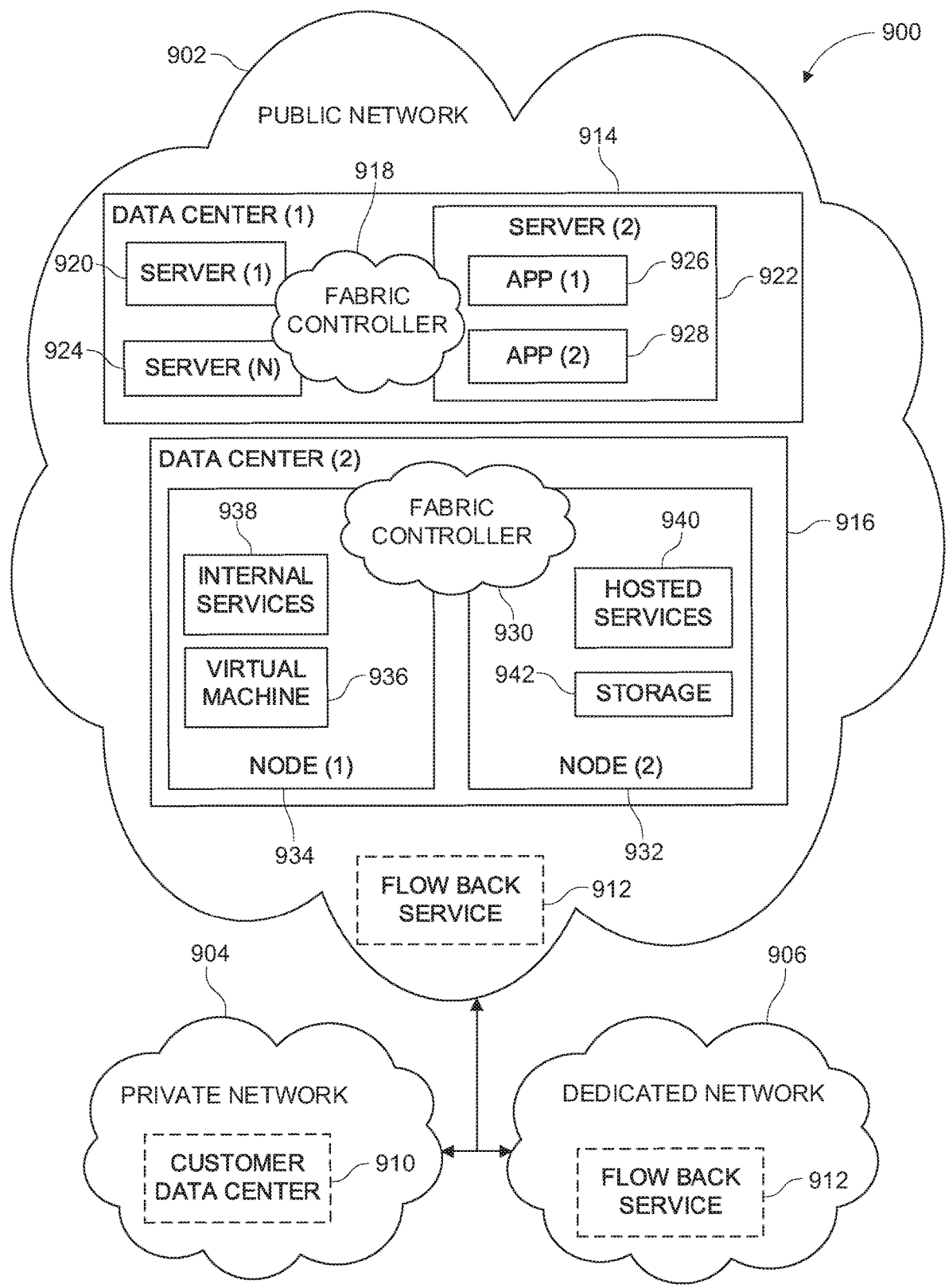
FIG. 9 is a block diagram of an example cloud-computing infrastructure suitable for implementing the various examples disclosed herein.

Turning now to FIG. 9, an exemplary block diagram illustrates a cloud-computing environment for implementing aspects, embodiments, and examples disclosed herein. Specifically, architecture 900 illustrates an exemplary cloud-computing infrastructure, suitable for use in implementing aspects, embodiments, and examples of the disclosure. Architecture 900 should not be interpreted as having any dependency or requirement related to any single component or combination of components illustrated therein. In addition, any number of nodes, virtual machines, data centers, role instances, or combinations thereof may be employed to achieve the desired functionality within the scope of aspects, examples, and embodiments of the present disclosure.

The distributed computing environment of FIG. 9 includes a public network 902, a private network 904, and a dedicated network 906. Public network 902 may be a public cloud-based network of computing resources, for example. Private network 904 may be a private enterprise network or private cloud-based network of computing resources. Dedicated network 906 may be a third-party network or dedicated cloud-based network of computing resources. In some examples, private network 904 may host a customer data center 910, and dedicated network 906 may host flowback service 912.

Hybrid cloud 908 may include any combination of public network 902, private network 904, and dedicated network 906. For example, dedicated network 906 may be optional, with hybrid cloud 908 comprised of public network 902 and private network 904. Along these lines, some customers may opt to only host a portion of their customer data center 910 in the public network 902 and/or dedicated network 906, retaining some of the customers' data or hosting of customer services in the private network 904. For example, a customer that manages oil and gas flowback equipment or sand separators may store any of disclose sensor data in its own private network 904. Alternatively, customer data centers 910 may use a hybrid cloud 908 in which some data storage and processing is performed in the public network 902 while other data storage and processing is performed in the dedicated network 906.

Public network 902 may include data centers configured to host and support operations, including tasks of a distributed application, according to the fabric controller 918. It will be understood and appreciated that data center 914 and data center 916 shown in FIG. 9 are merely examples of suitable implementations for accommodating one or more distributed applications, and are not intended to suggest any limitation as to the scope of use or functionality of examples disclosed herein. Neither should data center 914 and data center 916 be interpreted as having any dependency or requirement related to any single resource, combination of resources, combination of servers (e.g., servers 920 and 924) combination of nodes (e.g., nodes 932 and 934), or set of APIs to access the resources, servers, and/or nodes.

Data center 914 illustrates a data center comprising a plurality of servers, such as servers 920 and 924. A fabric controller 918 is responsible for automatically managing the servers 920 and 924 and distributing tasks and other resources within the data center 914. By way of example, the fabric controller 918 may rely on a service model (e.g., designed by a customer that owns the distributed application, etc.) to provide guidance on how, where, and when to configure server 922 and how, where, and when to place application 926 and application 928 thereon. One or more role instances of a distributed application may be placed on one or more of the servers 920 and 924 of data center 914, where the one or more role instances may represent the portions of software, component programs, or instances of roles that participate in the distributed application. In other examples, one or more of the role instances may represent stored data that are accessible to the distributed application.

Data center 916 illustrates a data center comprising a plurality of nodes, such as node 932 and node 934. One or more virtual machines may run on nodes of data center 916, such as virtual machine 936 of node 934 for example. Although FIG. 9 depicts a single virtual node on a single node of data center 916, any number of virtual nodes may be implemented on any number of nodes of the data center in accordance with illustrative embodiments of the disclosure. Generally, virtual machine 936 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine(s) 936 may include processing capacity, storage locations, and other assets within the data center 916 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 930 is responsible for automatically managing the virtual machines running on the nodes of data center 916 and for placing the role instances and other resources (e.g., software components, etc.) within the data center 916. By way of example, the fabric controller 930 may rely on a service model (e.g., designed by a customer that owns the service application) to provide guidance on how, where, and when to configure the virtual machines, such as virtual machine 936, and how, where, and when to place the role instances thereon.

As discussed above, the virtual machines may be dynamically established and configured within one or more nodes of a data center. As illustrated herein, node 932 and node 934 may be any form of computing devices, such as, for example, a personal computer, a desktop computer, a laptop computer, a mobile device, a consumer electronic device, a server, the computing device 800 of FIG. 8, and/or the like. In one instance, the nodes 932 and 934 host and support the operations of the virtual machine(s) 936, while simultaneously hosting other virtual machines carved out for supporting other tenants of the data center 916, such as internal services 938 and hosted services 940. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role instances that reside on the nodes support operation of service applications, and may be interconnected via application programming interfaces (APIs). In one instance, one or more of these interconnections may be established via a network cloud, such as public network 902. The network cloud serves to interconnect resources, such as the role instances, which may be distributed across various physical hosts, such as nodes 932 and 934. In addition, the network cloud facilitates communication over channels connecting the role instances of the service applications running in the data center 916. By way of example, the network cloud may include, without limitation, one or more communication networks, such as local area networks (LANs) and/or wide area networks (WANs). Such communication networks are commonplace in offices, enterprise-wide computer networks, intranets, and the Internet, and therefore need not be discussed at length herein.

Example Operating Environment

Although described in connection with the example computing devices 220, 320, and 800, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The examples illustrated and described herein, as well as examples not specifically described herein but within the scope of aspects, examples, and embodiments of the disclosure, constitute exemplary means for automatically emptying the vessel of a sand separator. For example, the elements described in FIGS. 2 and 3, such as when encoded to perform the operations described with reference to FIGS. 2 and 3 and illustrated in FIGS. 6 and 7, constitute exemplary means for automatically emptying the vessel of a sand separator.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects, examples, and embodiments of the disclosure.

The following clauses describe further aspects of the disclosure:
Clause Set A:
  A1. A frac sand separator system comprising:
  a sand separator comprising an inlet fluidly connected to a well for receiving a fracking return mixture from the well, the sand separator configured to separate water of the fracking return mixture from particulate matter of the fracking return mixture, the sand separator comprising an outlet;
  a collection container fluidly connected to the outlet of the sand separator for receiving the particulate matter from the sand separator;
  at least one outlet valve fluidly connected between the outlet of the sand separator and the collection container; and
  a computing device operatively connected to the at least one outlet valve, the computing device comprising a processor configured to automatically open the at least one outlet valve such that the particulate matter is released from the sand separator into the collection container.

A2. The frac sand separator system of clause A1, wherein the processor is configured to automatically open the at least one outlet valve upon the passage of a predetermined amount of time.

A3. The frac sand separator system of clause A1, wherein the processor is configured to automatically open the at least one outlet valve based on a level of the particulate matter within the sand separator.

A4. The frac sand separator system of clause A1, wherein the processor is configured to determine a level of the particulate matter within the sand separator based on at least one temperature of the sand separator, the processor being configured to automatically open the at least one outlet valve when the determined level equals or exceeds a predetermined level.

A5. The frac sand separator system of clause A1, further comprising at least one temperature sensor configured to measure at least one temperature of the sand separator, the computing device being operatively connected to the at least one temperature sensor for receiving the at least one measured temperature from the at least one temperature sensor, wherein the processor is configured to automatically open the at least one outlet valve based on the at least one measure temperature received from the at least one temperature sensor.

A6. The frac sand separator system of clause A1, further comprising at least one mass sensor configured to measure a mass of the sand separator, the computing device being operatively connected to the at least one mass sensor for receiving the measured mass from the at least one mass sensor, wherein the processor is configured to automatically open the at least one outlet valve when the measured mass approximately equals or exceeds a predetermined mass.

A7. The frac sand separator system of clause A1, further comprising at least one level sensor configured to measure a level of the particulate matter within the sand separator, the at least one level sensor comprising at least one of a nuclear densometer, an acoustic sensor, or a radar sensor, the computing device being operatively connected to the at least one level sensor for receiving the measured level from the at least one level sensor, wherein the processor is configured to automatically open the at least one outlet valve based on the measured level received from the at least one level sensor.

A8. The frac sand separator system of clause A1, wherein the outlet is a particulate outlet and the sand separator further comprises a water outlet for releasing the water from the sand separator, the frac sand separator system further comprising a particulate sensor configured to detect particulate matter within the water outlet, the computing device being operatively connected to the particulate sensor, wherein the processor is configured to automatically open the at least one outlet valve based on whether particulate matter is detected by the particulate sensor.

A9. The frac sand separator system of clause A1, wherein the processor is configured to automatically close the at least one outlet valve based on at least one of: a predetermined period of time the at least one outlet valve has been open, a temperature of the sand separator, a mass of the sand separator, a level of the particulate matter within the sand separator, a pressure within the outlet, or an amount of particulate matter detected within the outlet.

A10. The frac sand separator system of clause A1, further comprising a choke valve operatively connected between the outlet of the sand separator and the collection container, the computing device being operatively connected to the choke valve, wherein the processor is configured to automatically open and close the choke valve based on a pressure within the outlet of the sand separator.

Clause Set B:

B1. A computerized method comprising:
receiving a fracking return mixture from a well into a sand separator;
separating the fracking return mixture within the sand separator into water and particulate matter; and
automatically opening an outlet valve of the sand separator such that the particulate matter is released from the sand separator into a collection container.

B2. The computerized method of clause B1, wherein automatically opening the outlet valve of the sand separator comprises automatically opening the outlet valve upon the passage of a predetermined amount of time.

B3. The computerized method of clause B1, wherein automatically opening the outlet valve of the sand separator comprises automatically opening the outlet valve based on a level of the particulate matter within the sand separator.

B4. The computerized method of clause B1, wherein automatically opening the outlet valve of the sand separator comprises automatically opening the outlet valve based on at least one measured temperature of the sand separator.

B5. The computerized method of clause B1, wherein automatically opening the outlet valve of the sand separator comprises:
measuring at least one temperature of the sand separator;
determining a level of the particulate matter within the sand separator based on the at least one measured temperature; and
automatically opening the outlet valve based on the determined level of the particulate matter within the sand separator.

B6. The computerized method of clause B1, wherein automatically opening the outlet valve of the sand separator comprises automatically opening the outlet valve based on a mass of the sand separator.

B7. The computerized method of clause B1, wherein automatically opening the outlet valve of the sand separator comprises automatically opening the outlet valve based on whether particulate matter is detected within a water outlet of the sand separator.

B8. The computerized method of clause B1, further comprising automatically closing the outlet valve based on at least one of: a predetermined period of time the outlet valve has been open, a temperature of the sand separator, a mass of the sand separator, a level of the particulate matter within the sand separator, a pressure within an outlet of the sand separator, or an amount of particulate matter detected within the outlet.

Clause Set C:

C1. One or more computer storage media having computer-executable instructions that, in response to execution by a processor, cause the processor to at least:
receive a fracking return mixture from a well into a sand separator;
separate the fracking return mixture within the sand separator into water and particulate matter; and
automatically open an outlet valve of the sand separator such that the particulate matter is released from the sand separator into a collection container.

C2. The one or more computer storage media of clause C1, wherein automatically opening the outlet valve of the sand separator comprises:
measuring at least one temperature of the sand separator;
determining a level of the particulate matter within the sand separator based on the at least one measured temperature; and
automatically opening the outlet valve based on the determined level of the particulate matter within the sand separator.

It is to be understood that the above description is intended to be illustrative, and not restrictive. For example, the above-described embodiments, examples, and aspects may be used in combination with each other. Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Further, each independent feature or component of any given assembly may constitute an additional embodiment. In addition, many modifications may be made to adapt a particular situation or material to the teachings of the disclosure without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the disclosure should, therefore, be determined with reference to the appended claims, along with the full scope of equivalents to which such claims are entitled.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "clockwise" and "counterclockwise", "left" and right", "front" and "rear", "above" and "below" and the like are used as words of convenience to provide reference points and are not to be construed as limiting terms.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. For example, in this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised", "comprises", "having", "has", "includes", and "including" where they appear. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property can include additional elements not having that property. The term "exemplary" is intended to mean "an example of" The phrase "one or more of the following: A, B, and C" means "at least one of A and/or at least one of B and/or at least one of C." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Although the terms "step" and/or "block" may be used herein to connote different elements of methods employed, the terms should not be interpreted as implying any particular order among or between various steps herein disclosed unless and except when the order of individual steps is explicitly described. The order of execution or performance of the operations in examples of the disclosure illustrated and described herein is not essential, unless otherwise specified. The operations may be performed in any order, unless otherwise specified, and examples of the disclosure may include additional or fewer operations than those disclosed herein. It is therefore contemplated that executing or performing a particular operation before, contemporaneously with, or after another operation is within the scope of aspects of the disclosure.

Having described aspects of the disclosure in detail, it will be apparent that modifications and variations are possible without departing from the scope of aspects, embodiments, and examples of the disclosure as defined in the appended claims. As various changes could be made in the above constructions, products, systems, and methods without departing from the scope of aspects of the disclosure, it is intended that all matter contained in the above description and shown in the accompanying drawings shall be interpreted as illustrative and not in a limiting sense.

What is claimed is:

1. A frac sand separator system comprising:
   a sand separator comprising an inlet fluidly connected to a well,
      the sand separator configured to receive a fracking return mixture from the well,
      the sand separator configured to separate water of the fracking return mixture from particulate matter of the fracking return mixture, and
      the sand separator comprising an outlet;
   a scale fluidly connected to the outlet of the sand separator, wherein the scale includes:
      a housing coupled to a collection container,
      a receptacle coupled to the housing, the receptacle configured to:
         receive the particulate matter from the sand separator, and
         drain water from the received particulate matter; and
      an actuator coupled to the housing and the receptacle, the actuator configured to empty the particulate matter from the receptacle;
   wherein the collection container, downstream of the scale, is configured to receive the particulate matter from the scale;
   at least one outlet valve fluidly connected between the outlet of the sand separator and the scale; and
   a computing device operatively connected to the at least one outlet valve,
      the computing device comprising a processor configured to open the at least one outlet valve to release the particulate matter from the sand separator to the scale.

2. The frac sand separator system of claim 1, wherein the processor is configured to automatically open the at least one outlet valve upon the passage of a predetermined amount of time.

3. The frac sand separator system of claim 1, wherein the processor is configured to automatically open the at least one outlet valve based on a level of the particulate matter within the sand separator.

4. The frac sand separator system of claim 1, wherein the processor is configured to determine a level of the particulate matter within the sand separator based on at least one temperature of the sand separator, the processor being configured to automatically open the at least one outlet valve when the determined level equals or exceeds a predetermined level.

5. The frac sand separator system of claim 1, further comprising at least one temperature sensor configured to measure at least one temperature of the sand separator, the computing device being operatively connected to the at least one temperature sensor for receiving the at least one measured temperature from the at least one temperature sensor, wherein the processor is configured to automatically open the at least one outlet valve based on the at least one measured temperature received from the at least one temperature sensor.

6. The frac sand separator system of claim 1, further comprising at least one mass sensor configured to measure a mass of the sand separator, the computing device being operatively connected to the at least one mass sensor for receiving the measured mass from the at least one mass sensor, wherein the processor is configured to automatically open the at least one outlet valve when the measured mass approximately equals or exceeds a predetermined mass.

7. The frac sand separator system of claim 1, further comprising at least one level sensor configured to measure a level of the particulate matter within the sand separator, the at least one level sensor comprising at least one of a nuclear densometer, an acoustic sensor, or a radar sensor, the computing device being operatively connected to the at least one level sensor for receiving the measured level from the at least one level sensor, wherein the processor is configured to automatically open the at least one outlet valve based on the measured level received from the at least one level sensor.

8. The frac sand separator system of claim 1, wherein the outlet is a particulate outlet and the sand separator further comprises a water outlet for releasing the water from the sand separator, the frac sand separator system further comprising a particulate sensor configured to detect particulate matter within the water outlet, the computing device being operatively connected to the particulate sensor, wherein the processor is configured to automatically open the at least one outlet valve based on whether particulate matter is detected by the particulate sensor.

9. The frac sand separator system of claim 1, wherein the processor is configured to automatically close the at least one outlet valve based on at least one of: a predetermined period of time the at least one outlet valve has been open, a temperature of the sand separator, a mass of the sand separator, a level of the particulate matter within the sand separator, a pressure within the outlet, or an amount of particulate matter detected within the outlet.

10. The frac sand separator system of claim 1, further comprising a choke valve operatively connected between the outlet of the sand separator and the collection container, the computing device being operatively connected to the choke valve, wherein the processor is configured to automatically open and close the choke valve based on a pressure within the outlet of the sand separator.

11. A kit configured to be used with a frac sand separator system, the kit comprising:
a scale configured to be fluidly connected to a particulate outlet of a sand separator, the scale configured to:
receive particulate matter from the particulate outlet of the sand separator;
drain water from the received particulate matter; and
release the particulate matter from the scale to a collection container of the frac sand separator system;
an outlet valve configured to be fluidly connected between the particulate outlet of the sand separator and the scale; and
a computing device configured to be operatively connected to the outlet valve and the scale, the computing device comprising a processor configured to:
automatically open the outlet valve to release the particulate matter from the sand separator to the scale;
automatically close the outlet valve to stop the release of the particulate matter from the sand separator to the scale;
determine a weight of the particulate matter, in the scale, based on an amount of the particulate matter released from the sand separator to the scale between the automatic opening and automatic closing of the outlet valve; and
cause an actuator associated with the scale to release the particulate matter from the scale.

12. The kit of claim 11, wherein the processor is configured to open the outlet valve at a predetermined time interval.

13. The kit of claim 12, wherein the predetermined time interval increases during a frac operation.

14. The kit of claim 11, wherein the processor is configured to open the outlet valve based on a level of the particulate matter within the sand separator.

15. The kit of claim 11, wherein the processor is configured to open the outlet valve based on a temperature associated with the sand separator.

16. The kit of claim 11, wherein the processor is configured to open the outlet valve based on a mass of the sand separator.

17. The kit of claim 11, wherein the processor is configured to open the outlet valve based on detecting particulate matter within a water outlet of the sand separator.

18. A computing device configured to be used with a frac sand separator system including a sand separator, an outlet valve, a scale, and a collection container, the computing device comprising:
one or more memories; and
one or more processors configured to:
automatically open the outlet valve to release particulate matter from the sand separator to the scale;
automatically close the outlet valve to stop the release of particulate matter from the sand separator to the scale; and
cause an actuator associated with the scale to release the particulate matter, received from the sand separator to the scale between the automatic opening and automatic closing of the outlet valve, to the collection container,
wherein the scale is configured to drain water from the particulate matter received from the sand separator.

19. The computing device of claim 18, wherein the one or more processors are further configured to:
determine a weight of the particulate matter, in the scale, based on an amount of the particulate matter received from the sand separator to the scale between the automatic opening and automatic closing of the outlet valve.

\* \* \* \* \*